United States Patent
Schmidt-Boecking et al.

(10) Patent No.: US 9,797,366 B2
(45) Date of Patent: Oct. 24, 2017

(54) PUMPED-STORAGE POWER PLANT

(71) Applicants: Horst Schmidt-Boecking, Kelkheim-Ruppertshain (DE); Gerhard Luther, Saarbruecken (DE)

(72) Inventors: Horst Schmidt-Boecking, Kelkheim-Ruppertshain (DE); Gerhard Luther, Saarbruecken (DE)

(73) Assignee: Roentdek-Handels, Kelkheim-Ruppertshain (DE)

( * ) Notice: Subject to any disclaimer, the term of this patent is extended or adjusted under 35 U.S.C. 154(b) by 0 days.

(21) Appl. No.: 14/357,328

(22) PCT Filed: Nov. 12, 2012

(86) PCT No.: PCT/EP2012/072357
§ 371 (c)(1),
(2) Date: Aug. 8, 2014

(87) PCT Pub. No.: WO2013/068577
PCT Pub. Date: May 16, 2013

(65) Prior Publication Data
US 2015/0361948 A1    Dec. 17, 2015

(30) Foreign Application Priority Data
Nov. 11, 2011  (DE) ........................ 10 2011 118 206

(51) Int. Cl.
*F03B 13/10*   (2006.01)
*F03B 3/10*    (2006.01)
(Continued)

(52) U.S. Cl.
CPC ................ *F03B 13/10* (2013.01); *F03B 3/10* (2013.01); *F03B 13/06* (2013.01); *F03D 9/14* (2016.05);
(Continued)

(58) Field of Classification Search
CPC ...................................................... F03B 13/10
(Continued)

(56) References Cited

U.S. PATENT DOCUMENTS 3,939,356 A * 2/1976 Loane ..................... F02C 6/16
290/52
3,992,881 A * 11/1976 Scherrer ................. F04F 99/00
60/398

(Continued)

FOREIGN PATENT DOCUMENTS

EP    2345809    7/2011
GB    2032009    4/1980
(Continued)

OTHER PUBLICATIONS

JP 10-37840, Morishige, English translation of JP document.*
(Continued)

*Primary Examiner* — Julio C. Gonzalez
(74) *Attorney, Agent, or Firm* — Reising Ethington P.C.

(57) ABSTRACT

An underwater pumped storage power plant that includes: an accumulator system with pressure vessels fillable with water and; a water outlet for water flow out of the system into a surrounding ocean against hydrostatic water pressure (PT) corresponding to water depth (T); a pump at the water outlet to pump water out of the system by converting electrical energy into potential energy corresponding to a displaced water column PT; a water inlet to allow water flow into the system from the surrounding ocean; a common generator at the water inlet, to convert the potential energy back into electrical energy when water flows in; electric lines to transport the electrical energy from the ocean surface to the power plant and back, wherein the pressure vessels are pressure-resistant and resistant to deformation from the PT at the ocean floor.

9 Claims, 15 Drawing Sheets

(51) Int. Cl.
F03B 13/06 (2006.01)
F03D 9/14 (2016.01)

(52) U.S. Cl.
CPC ............... *Y02E 10/20* (2013.01); *Y02E 10/22* (2013.01); *Y02E 10/223* (2013.01); *Y02E 10/32* (2013.01); *Y02E 10/72* (2013.01); *Y02E 60/17* (2013.01)

(58) Field of Classification Search
USPC ........................................ 290/43, 44; 60/398
See application file for complete search history.

(56) References Cited

U.S. PATENT DOCUMENTS

| | | | | |
|---|---|---|---|---|
| 4,321,475 | A * | 3/1982 | Grub | F03B 13/06 290/52 |
| 7,281,371 | B1 * | 10/2007 | Heidenreich | F03B 13/00 60/398 |
| 7,795,748 | B2 | 9/2010 | DeAngeles | |
| 7,911,073 | B2 | 3/2011 | Smith | |
| 8,997,475 | B2 * | 4/2015 | Ingersoll | F02G 1/02 138/31 |
| 2012/0260839 | A1 * | 10/2012 | Maher | B65D 90/02 114/257 |

FOREIGN PATENT DOCUMENTS

| | | | | |
|---|---|---|---|---|
| GB | 2069618 | | 8/1981 | |
| JP | 03294662 A | * | 12/1991 | |
| JP | H03294662 | | 12/1991 | |
| JP | H03294662 A | | 12/1991 | |
| JP | H045475 | | 1/1992 | |
| JP | H09317622 | | 9/1997 | |
| JP | 09317622 A | * | 12/1997 | |
| JP | 10037840 A | * | 2/1998 | |
| JP | H1037840 | | 2/1998 | |
| JP | 2010159695 A | | 7/2010 | |
| WO | 2009111861 | | 9/2009 | |
| WO | WO 2009111861 A1 | * | 9/2009 | ............... E02B 9/08 |
| WO | 2011084164 | | 7/2011 | |
| WO | 2011112561 | | 9/2011 | |

OTHER PUBLICATIONS

JP 09-317622, Morishige, English translation of JP document.*
Japanese Office Action with English Translation, Patent Application No. 2014-540499, Service No. 232957, Mail Date: May 26, 2015.
Translation of International Preliminary Report on Patentability and Written Opinion, Int. Serial No. PCT/EP2012/072357, Int. Filing Date: Nov. 12, 2012, Applicant: Roentdek-Handels GmbH et al., Mail Date: May 22, 2014.
International Search Report and Written Opinion, Int. Serial No. PCT/EP2012/072357, Int. Filing Date: Nov. 11, 2012, Applicant: Roentdek-Handels GmbH, Date Mailed:.
German Office Action, Applicant: Roentdek-Handels GmbH, DE Serial No. 10 2011 118206.7 DE Filing Date: Nov. 11, 2011, Date of Mailed: Aug. 29, 2012.
Japanese Office Action, Application No. 2016-127139, Date of Drafting: May 31, 2017.

* cited by examiner

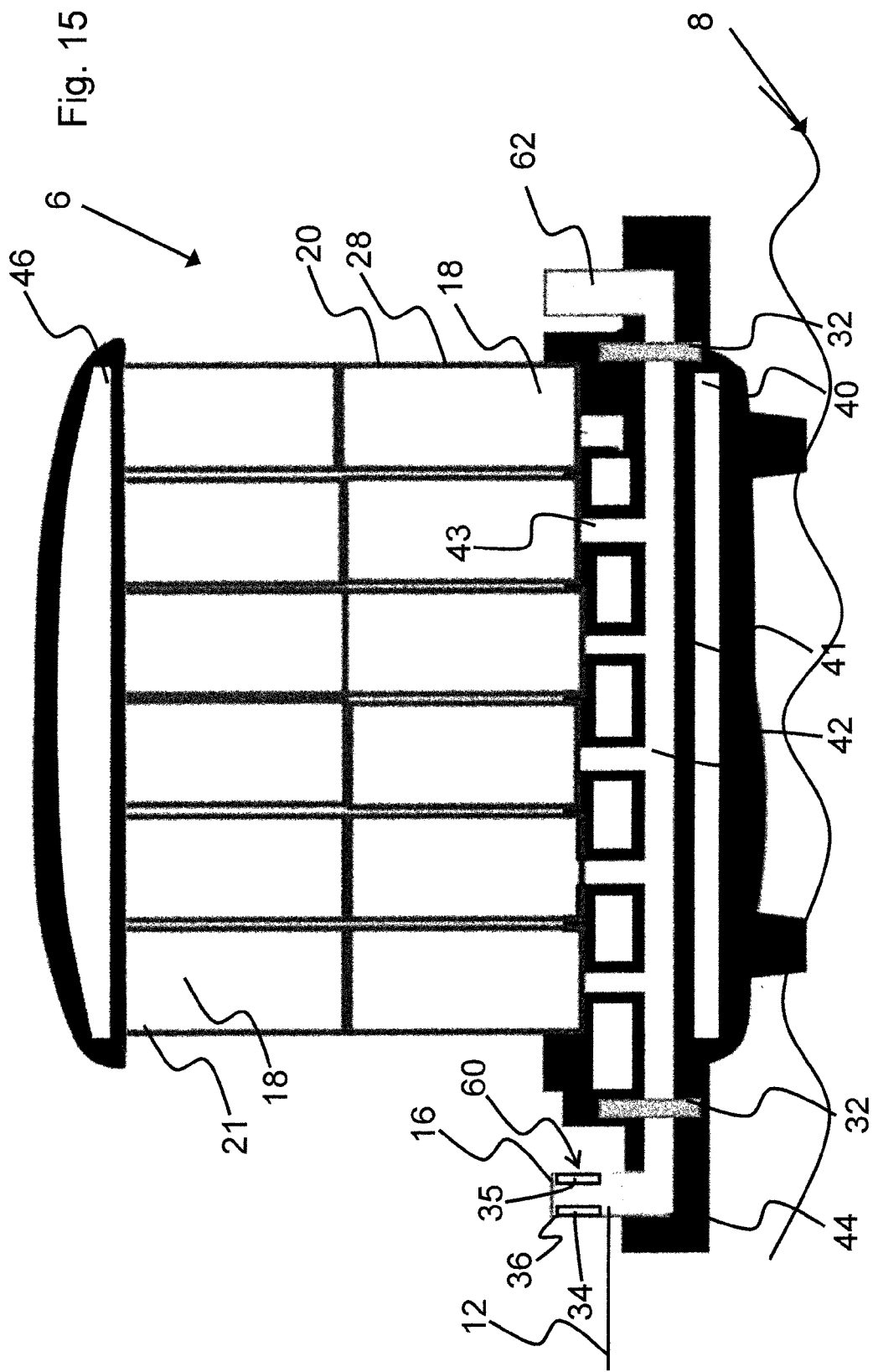

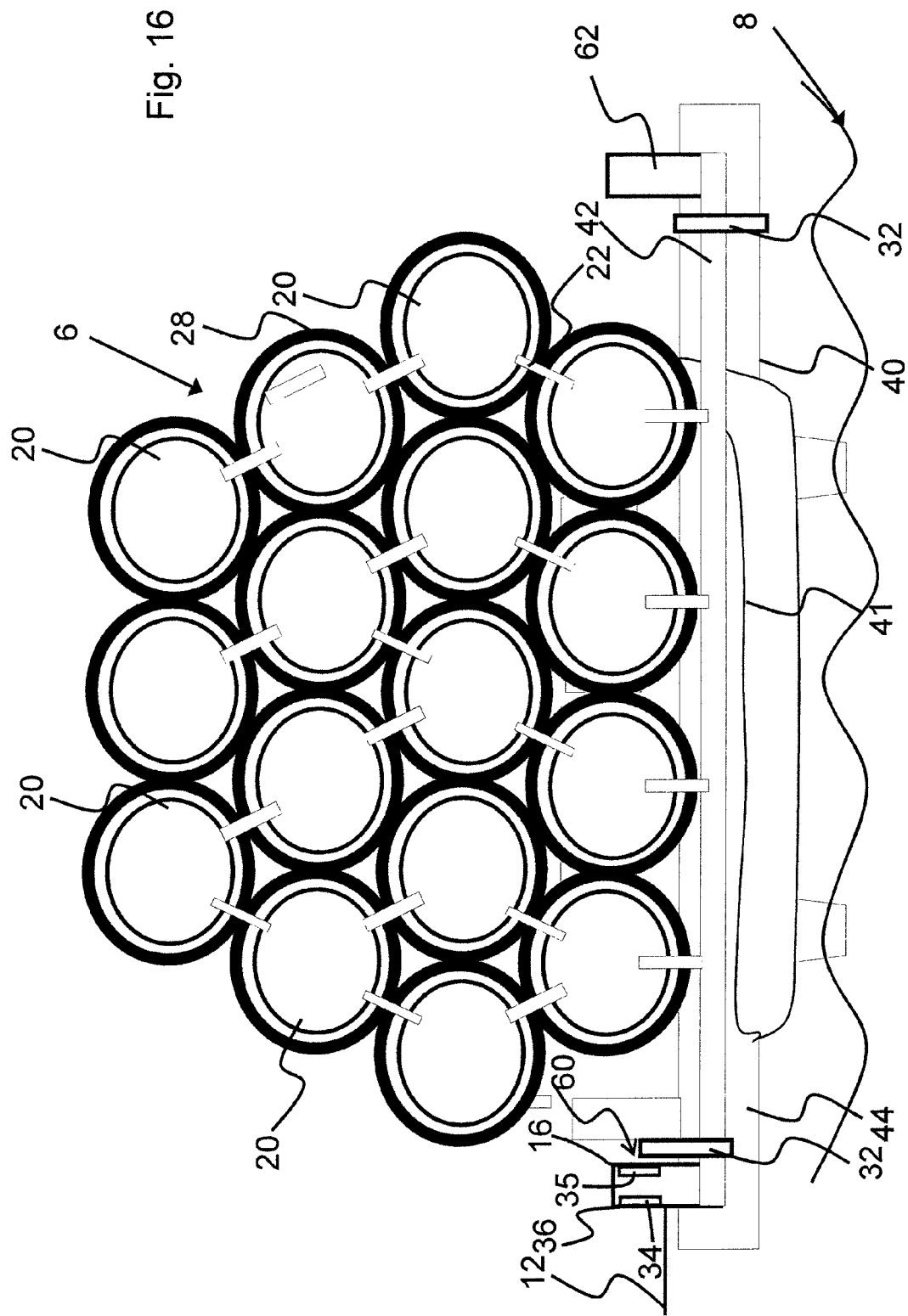

PUMPED-STORAGE POWER PLANT

TECHNICAL FIELD

The present disclosure concerns a pumped storage power plant for temporary reversible storage of energy, such as energy from wind power stations and/or photovoltaic systems with fluctuating availability over time, and also concerns a power supply network having a pumped storage power plant, and a method for reversible temporary storage of electrical energy from primary power plants.

BACKGROUND

As a result of the irregular distribution of solar radiation over the surface of the earth, a known temperature distribution arises between the tropics and subtropics on the one hand, and the polar regions on the other hand. This energy gradient is responsible for the known, prevailing large global wind systems, which transport a majority of the radiant energy absorbed by the Earth's surface in the form of wind, to regions including Europe, the Atlantic, the North Sea, etc. in the case of the northern hemisphere.

For many centuries now, mankind has been utilizing the power of the wind, a power which corresponds, on average, to an energy output of approximately 1 kilowatt per square meter of surface area. Using modern wind power stations, this energy can also be converted into the form of electrical energy and used in manifold ways.

Wind force and wind direction are subject to climatic and natural variations, however, and the wind frequently can cease, as well. An industrial society can only use wind power as a reliable energy source if it is continuously available, however.

One possibility for achieving a more continuous delivery of electrical energy to a power supply network or the like is afforded when a portion of the electrical energy thus generated can be temporarily stored in a sufficient quantity over a time period of at least hours, and possibly days. The energy from the temporary storage can then be fed into the power supply network during a lull in the wind so that a continuous delivery is ensured. The same applies to electrical energy from photovoltaic systems.

If such storage were successful on a large scale, these renewable energy sources could be used to cover base load demand better, and could one day fully replace fossil energy generation and nuclear energy.

Traditional direct storage devices for electricity, such as rechargeable batteries, are only able to store relatively small quantities of energy, have high storage losses, and are also very expensive and thus not economically usable on a large scale. The currently much-discussed chemical storage methods (e.g., electrolysis of water) and compressed air storage have a relatively poor efficiency in the recovery of the energy thus stored because of the heat losses alone. A utilization efficiency on the order of only approximately 30% is a good value for these storage types.

Consequently, according to the current state of the art, only pumped storage hydroelectric power plants (PSH) remain as a means of storing electrical energy efficiently and on a large scale. These plants can achieve a recovery efficiency of approximately 80% for the stored energy. In these systems, water is pumped from a lower storage basin to an upper storage basin—usually to artificial storage lakes—during periods when there is surplus electricity. The larger the storage basins and the greater the height difference is, the more energy can be stored. When there is a demand for electricity, the water that has been pumped upward in this way is allowed to flow through turbines back to the lower storage basin. During this process, the difference in the water's potential energy is converted into electrical energy. The power W is obtained from the product of the height difference h between the two storage basins and the water flow rate M. This simple formula applies (for a density of water of 1000 kg/m³): $W (kW) = 9.81 \cdot M (m^3/s) \cdot h (m)$. Hence, the total capacity of the energy storage system results from $E (kW) = 9.81 \cdot M \cdot h \cdot t / 3600$ (hours), where t is the maximum time period in hours for lowering the water level in the upper storage basin. In the case of a pumped storage power plant, therefore, phases of pumping, storage, and power generation alternate continuously with one another. The pumped storage power plants can be started up in a minimum of time, and thus react quickly to power demand. Today, there are approximately 30 pumped storage power plants in Germany, with locations in the low mountains and even high mountains because of the required difference in height; the largest plants in Germany are at Goldisthal in Thuringia (power output approximately 1 gigawatt and energy storage capacity approximately 8.5 GWh with a usable volume of approximately 12 million cubic meters) and Markersbach in Saxony (power output approximately 1 gigawatt and energy storage capacity approximately 4 GWh). Taken as a whole, the power output of all the pumped storage power plants in Germany totals nearly 7 gigawatts.

However, the demand for such pumped storage power plants exceeds the potential capacity that is typically present, and nearby energy storage facilities are needed primarily for the wind energy harvested offshore. Thus, expanding these capacities is an important task for the national economy (see, for example, the Energy Research Center of Niedersachsen [Energie-Forschungszentrum Niedersachsen], Goslar, http://www.efzn.de). The construction of new pumped storage power plants in the mountains and in old mines as possible expansion capacities is currently under discussion. Utilization of underground mining facilities requires a large above-ground water reservoir. The construction thereof often fails because of existing residential areas or other existing uses. Moreover, the volumes present in mining facilities are small and are distributed over long, underground distances so that high-capacity power plants can only be implemented with difficulty. Furthermore, in some cases the storage requires long power transmission distances and problematic intervention in the balance of nature. Generally speaking, the availability of suitable sites for such pumped storage power plants is limited throughout the world.

For this reason, a completely different approach for new pumped storage power plants, which at first glance may seem unrealistic, is introduced here.

German Patent Application 10 2011 013,329.1 discloses a pumped storage power plant with a pressure vessel to be sunk onto the ocean floor.

WO 2011/112561 discloses an "Offshore Energy Harvesting, Storage and Power Generation System" with energy storage and power generation units that are anchored to the sea floor.

GENERAL DESCRIPTION OF THE PRESENT DISCLOSURE

An object of the present disclosure is to provide a novel pumped storage power plant that is almost arbitrarily scalable because of a modular construction and can provide an enormous storage capacity without burdening the existing landscape.

The object of the present disclosure is attained by the subject matter of the independent claims. Further developments of the present disclosure are defined in the dependent claims.

The present disclosure utilizes the basic concept of using the ocean as the upper storage basin or water reservoir of a pumped storage power plant. Pressure vessels sunk onto the ocean floor serve as the lower storage basin or water reservoir. Accordingly, the lower water reservoir (the one with the lower potential energy) is an artificially created space, in particular, a hollow space formed by the pressure vessel.

According to the present disclosure, an underwater pumped storage power plant for temporary reversible storage of energy from other power plants, such as power plants producing fluctuating energy over time, for example wind power stations and/or photovoltaic systems, is provided. Like any pumped storage power plant, this pumped storage power plant also uses a first and a second water reservoir, wherein the water in the second water reservoir has a higher potential energy than in the first water reservoir. For temporary reversible storage of the electrical energy, water is pumped from the first water reservoir into the second water reservoir, and to recover the electrical energy, the water is allowed to flow from the second water reservoir back into the first water reservoir, during which process a generator converts back into electrical energy the potential energy that was stored when "pumping [the water] up." For storage and recovery of the electrical energy, the only thing that matters is the difference between the two water reservoirs in the potential energy of a volume of water. In a conventional pumped storage power plant, this is defined by the difference in height between the two basins.

In the present disclosure, the first water reservoir with the lower potential energy is now composed of an accumulator system made of artificial pressure vessels that can be filled with water, which system is sunk to the sea floor at a great depth. The accumulator system in this concept is built to be pressure-resistant such that it is resistant to deformation from the hydrostatic water pressure when it is pumped empty.

The second water reservoir with the higher potential energy is composed of the ocean itself, which surrounds the pressure vessel. When water is now allowed to flow into the accumulator system that is submerged at a water depth T, the potential energy corresponding to the difference in height from the ocean surface, which is to say the water depth T, is released. If the water is subsequently pumped back out of the accumulator system into the surrounding ocean against the hydrostatic pressure PT at the water depth T, it is necessary to use electrical energy corresponding to the water column pressing down on the accumulator system at the water depth T, and this energy can thus be stored; naturally, this is reduced by the power losses that are otherwise normal, as well.

Since the water is pumped out of the accumulator system with no atmospheric air flowing in after it, and thus a vacuum occurs that is limited only by the partial pressure of the water vapor, strictly speaking the atmospheric air pressure must still be added to the hydrostatic pressure of the water column. Quantitatively, however, this is irrelevant for the great ocean depths primarily aimed for here; in the case of an application in a relatively shallow lake or sea, the additional bars of atmospheric pressure corresponding to an additional depth of 10 m should be included in the calculation, however.

In other words, at least a water vapor pressure remains in the interior of the accumulator system. The water vapor pressure in the interior of the accumulator system is on the order of approximately 100 mbar or more than 100 mbar.

In order to store the water, the accumulator system of the underwater pumped storage power plant has at least two pressure vessels that can be filled with water and that together constitute a common accumulator volume. The pressure vessels can be capable of being coupled to one another or of being permanently connected to one another, for example, so that an accumulator system with a modular design is formed. Preferably, easy-to-assemble modules are used as pressure vessels, such as cylindrical or tubular or polyhedral or cubical pressure vessels, for example, which ensure good volume utilization when several of these pressure vessels are set up next to one another.

The pressure vessels preferably have no moving parts. This means that no mechanical or electrical power components that are used for power generation or power dissipation (pump, turbine) are installed in or on the pressure vessel.

Preferably, the pressure vessels of the accumulator system are connected to one another by a sump. The sump constitutes the deepest, or at least one of the deepest, points of the accumulator system so that the water always collects in the sump, for example, through the simple exploitation of gravity.

In order to allow the water to flow out, the accumulator system has a water outlet located at the sump with a pump located directly at the water outlet. The water is pumped out of the accumulator system by the pump directly into the surrounding ocean against the hydrostatic pressure PT corresponding to the water depth, wherein the pump converts electrical energy into the potential energy corresponding to the displaced water column.

During the process of pumping the water out of the accumulator system, the presence of a residual intake pressure at the pump in the accumulator system is helpful for avoiding cavitation at the pump. Thus, calculations show that without atmospheric air or another gas flowing in after the water, a water column of 15 meters present at the pump is sufficient to reduce or even avoid cavitation. Accordingly, it may be helpful to incorporate this quantity in the structural shape of the accumulator system and in the provision of water ballast. For this reason, it also may be helpful under certain circumstances to equip each pressure vessel with a fore pump that produces an intake pressure for the pump.

The structural shape of the accumulator system can thus be designed such that the pump is located in the region of the sump, and the water column prevailing in the underwater pumped storage power plant plus the vapor pressure produces a water column intake pressure equivalent to approximately 15 meters water column at the pump. This intake pressure may be helpful, since in this way it is possible to use large-scale pumps that currently are commercially available. Furthermore, when a water column intake pressure of currently at least 15 meters is present at the pump, ventilation of the pressure vessel can be omitted.

The underwater pumped storage power plant additionally has a water inlet with a generator arranged directly at the water inlet. Preferably a common generator is used for the at least two or all pressure vessels so that during power generation operation the common generator fills the at least two pressure vessels of which the accumulator system is comprised through the water inlet, preferably uniformly. When the water is allowed to flow directly from the surrounding ocean, with the hydrostatic pressure corresponding to the water depth, into the accumulator system, the generator converts the potential energy of the previously displaced water column back into the corresponding electrical energy. The accumulator system additionally has valves at the inlet and outlet in order to close them when energy is not currently being stored or recovered. Accordingly, the water is pumped out and flows in only over the short distance into the accumulator system, which is closed except for the water inlet and water outlet.

Accordingly, if the accumulator system is submerged to a depth of, e.g., 2000 m below the ocean surface, this corresponds to a pumped storage power plant in which the second water reservoir is located 2000 m above the first water reservoir, which is already an extraordinarily great height difference for conventional pumped storage power plants.

Astonishingly, no long pipes are required to transport the water used for storing the electrical energy over a distance of 2000 m (or even further for a slope other than 90°). That is to say, it is sufficient to simply pump the water from the interior of the accumulator system out to the surrounding ocean, which represents a distance of only a few meters, and to allow it to flow back accordingly. The difference in potential that is built up by the pressure differences alone is surmounted in merely this short pumping distance. The difference in potential caused by gravitation is produced solely by the water column pressing down on the pressure vessel at the water depth T, without surmounting this distance. Consequently, there is no need either for pipes to transport water or for air lines between the pressure vessel and the ocean surface. We simply utilize the potential difference of the ocean depth in relation to the interior pressure of the accumulator system, although the possibility of the pumped storage power plant being submerged in a deep lake should not be ruled out here. All that is needed, therefore, is electric lines for transporting the electrical energy from the ocean surface to the accumulator system and back.

Moreover, one of the two storage basins or defined water reservoirs is completely "eliminated" by the present disclosure, since the surrounding ocean itself constitutes the second water reservoir (with the higher potential energy). The first water reservoir is composed of the interior of the accumulator system in the form of pressure vessels, such as pressure vessels of modular design that can be coupled to one another, or pressure tanks. The pressure tanks thus form a closed water storage volume, namely the water storage volume or water reservoir with the lower potential energy as compared to the surrounding ocean. As a result, the long pipes that must span the height difference in conventional pumped storage power plants are eliminated. This not only simplifies the construction, but also reduces frictional losses during transport of the water, making it possible to increase efficiency. Furthermore, the accumulator volume can be constructed in a modular manner such that large numbers of pressure vessels of this type are sunk to the ocean floor and coupled to one another in order to achieve a sufficiently large water storage volume, and hence the desired energy storage capacity, without occupying usable landscape above ground. Thus, with a plurality of pressure vessels, the vessels use the common pump(s) and common generator(s) so that the pressure vessels constitute a common accumulator volume, and several pumps and/or generators can be spared.

It is also possible to install a plurality of such pumped storage power plants on the ocean floor. Accordingly, such a network of underwater pumped storage power plants preferably comprises a large number of accumulator systems located on the ocean floor that are connected electrically to one another on the ocean floor by a network of electric lines. There is no need to network with water pipes between the accumulator systems that are each equipped with a separate pump and generator.

The installation of an accumulator system may have one or more advantages. Firstly, a pumped storage power plant with such a modular construction can be provided that is matched in size to the application purpose and application site, and thus entails lower costs. Moreover, the choice and design of suitable pressure vessels is simplified, since pressure vessels that are optimal in terms of structure (the pressure vessel is a construction with considerable dead weight in the filled state) and design can be used and, moreover, the accumulator volume can be matched to the capacity of suitable pump and turbine units. Multiple pressure vessels can accordingly be connected together hydraulically to form an accumulator system, and filling and emptying take place at a single point. Naturally, the hydraulic connections must be constituted such that it is possible for the water to flow in and out unhindered.

Preferably, the connection of the pressure vessels to the sump has at least one shutoff valve for disconnecting at least one of the pressure vessels from the accumulator system so that an individual pressure vessel can also be disconnected from the rest of the accumulator system for maintenance purposes or in the case of leaks.

The modularity of the underwater pumped storage power plant can be further increased by the means that a pump-turbine unit is provided that accommodates, in particular, the water inlet, water outlet, common pump, and generator, as well as the electrical installation required for connection to the electric lines.

The pump-turbine unit can be constructed such, that it is capable of being decoupled, from the other components, such as, e.g., the accumulator system of the underwater pumped storage power plant. The decoupleable pump-turbine unit can thus be brought to the water surface while disconnected, for instance for maintenance purposes.

The accumulator system should have a volume that permits significant energy storage, for which reason the accumulator volume should be at least 100 or 1000 cubic meters, but can be many times larger, even several orders of magnitude larger where appropriate. Volumes in the range of one million cubic meters or more are even possible. The larger the individual pressure vessels are, the fewer vessels are required.

For example, large industrially manufactured cylindrical pipes or even basic spherical tanks can be used as pressure vessels. A spherical tank with a diameter of 100 meters has a volume of approximately 500,000 cubic meters. If 50 cubic meters of water per second are allowed to flow through the turbines, then this pumped storage power plant at a water depth of 2000 m delivers a power output of approximately 1 gigawatt for a period of approximately 3 hours. By combining multiple such cylindrical pipes or basic spherical tanks to make an accumulator system, either this power output can be increased commensurately, or an even greater storage capacity can be achieved. In this way, it is possible to store renewably generated energy in large quantities and without significant losses.

In useful fashion, the pressure vessels are made of steel and/or concrete, in particular fiber-reinforced concrete, which is to say they have a corresponding outer wall that is closed in three dimensions made of, e.g., steel—or fiber-reinforced concrete. A sufficiently pressure-resistant pressure vessel or hollow body can be constructed by this means. One possible structural shape of the pressure vessel has an inner supporting framework to provide support against water pressure, wherein the inner supporting framework should not hinder the water in the pressure vessel from flowing out toward the sump.

Preferably, the pressure vessel is built sufficiently solidly or is weighted such that, in the evacuated state in normal operation, it has a mass that is somewhat greater than the mass of the water displaced by the pressure vessel so that the pressure vessel sinks downward in the ocean even in the evacuated state in normal operation, so that the resources required for anchoring on the ocean floor are kept within limits. Where appropriate, the pressure vessel can even simply rest on the ocean floor without significant anchoring if it is heavy enough in every state of fill in normal operation. Nevertheless, the possibility should not be ruled out that the pressure vessel is slightly lighter than the displaced water, and the pressure vessel is anchored at the ocean floor.

The pressure vessels of the accumulator system have separate hollow spaces, for example in the outer walls, wherein bulk material can be poured into the hollow spaces as weighting material. By this means, the mass of the accumulator system can be further adjusted in retrospect in order to weight them such that they sink to the ocean floor. However, it may be helpful to first tare the hollow spaces with the bulk material such that the accumulator system and/or the base body still barely float(s), and then to pour in additional ballast water on site on the ocean. In an economical manner, the weighting material can be natural bulk material, for example sand, gravel, silt, or the like, whose mass can be additionally increased on site with water introduced into the bulk material in order to tare the mass more precisely on site. By introducing ballast water into the bulk material, the mass can be increased sufficiently that the pumped storage power plant sinks, but separate hollow spaces can also be filled with ballast water so that the ballast water can be pumped out again more easily in order to retrieve the entire pumped storage power plant or just individual components of the pumped storage power plant. In any case, the total ballast should be calculated such that it holds the pumped storage power plant on the ocean floor in normal operation. The distribution of weight, e.g., the arrangement of the ballast, can be asymmetrical so that the individual pressure vessel of the pumped storage power plant, or the entire underwater pumped storage power plant, has a defined orientation under water with a top and bottom, which facilitates the arrangement of the connections if necessary. The defined orientation of the pressure vessel or of the pumped storage power plant can also be achieved by the means that hollow spaces are not filled with ballast so that the air located therein produces buoyancy.

For example, the pressure vessel can have a water displacement of more than 50,000 $m^3$, preferably more than 100,000 $m^3$, and especially preferably more than 500,000 $m^3$. In the case of a water displacement of 500,000 $m^3$, the pressure vessel can have a maximum buoyant empty weight of 500,000 tons so that falling below the buoyant empty weight makes for a floating body, but the pressure vessel sinks as soon as the maximum buoyant empty weight is exceeded.

The pressure vessel preferably has a cylindrical shape. In the case of a cylindrical shape, the internal volume can be set by the length of the cylinder with a constant diameter, which is structurally simpler than producing a spherical shape with a large diameter as necessary. At its top end, the cylinder is provided with a top end piece, for example in the form of a cover, so that the top end is sealed to prevent sea water from entering the pressure vessel. The bottom end (sump) can likewise be provided with a cover in order to form a closed volume.

It is especially preferred for the pressure vessel to include a connection coupling. By means of the connection coupling, two pressure vessels so equipped can be detachably coupled to one another so that the accumulator volume can be constructed in a modular manner. The connection coupling preferably is equipped to be self-sealing, and for a cylindrical pressure vessel can be arranged in the cover, for example, so that multiple pressure vessels standing one upright on the other on the ocean floor can be coupled together.

The pressure vessel can also include a plurality of tubular segments lined up in a row and connected to one another. In a simple case, the segments are pipe sections that are welded, adhesive-bonded, or sealed together whose wall thickness is chosen such that the water pressure at the ocean floor does not deform the pressure vessel. In this way, pipe sections that are each 10 meters in length, for example, can be transported individually to the installation site, where they can be connected to one another at sea to make pipes of, e.g., 100 meters in length, which are provided with covers and anchored upright on the ocean floor. The pipe segments can also each have separate covers and be connected to one another by means of self-sealing connection couplings so that a common accumulator volume is likewise formed.

In an especially preferred embodiment, an integrated accumulator complex is made of closely packed, upright pipes, in particular steel pipes, fiber-reinforced concrete pipes, or pipes made of other compound materials. The hollow spaces between the pipes can be filled with a filler in order to stabilize the accumulator complex and to weight the accumulator system. The filler in this design could be concrete, bulk material, or a plastic compound, or a combination of the aforesaid materials.

In one embodiment, the pressure vessel or the integrated accumulator complex has a top end piece for closing off the pressure vessel or the multiple pressure vessels of the integrated accumulator complex and for sealing to prevent sea water from entering the pressure vessel.

It may be helpful if the pressure vessels of the accumulator system are coupled to a base body or are connected thereto, wherein the base body can accommodate the pressure vessels and the other components of the pumped storage power plant, which is to say, in particular, the pump and the generator, in a modular fashion. In this design, the connection of the pressure vessels to the common pump is composed of an integral passage in the interior of the base body so that the pressure vessels are connected to one another through the base body, producing a common pressure vessel volume from the connected pressure vessels by means of the base body after the pressure vessels have been installed on the base body. It is preferred in this design for the pump and the common generator to be arranged in a pump-turbine unit, and it is especially preferred for the pump-turbine unit to also be disconnectable in a modular fashion from the base body. The highly modular construction of the underwater pumped storage power plant with a base body, a disconnectable pump-turbine unit, and disconnectable pressure vessels permits easy matching of the components to the demands placed on the power storage system and also permits a reduction in costs during installation and maintenance of the power plant. For example, it can be assumed that the components of the pump-turbine unit have a shorter service life than the pressure vessels or the base body.

Moreover, the base body is preferably designed such that the water column for producing the pump intake pressure, which may be helpful for the pump, is provided in the base body itself. To this end, the integral passage inside the base body, in particular, can be appropriately shaped or can have a sufficient length that the water column is achieved in just the integral passage. In this way, the volume in the pressure vessel can be completely or predominantly utilized, which is to say, for example, can be emptied.

The base body preferably has feet for stable and secure support of the base body on the ocean floor. Depending on the chosen structural shape of the base body and the composition of the ocean floor, 2, 3, or more feet may be advantageous.

If the pressure vessels and/or the base body are equipped with self-sealing connection couplings, it is possible to detachably connect the pressure vessels to the base body and/or directly to other pressure vessels. The pump-turbine unit can also be equipped with a connection coupling so that it can be uncoupled from the base body and brought to the surface separately for maintenance purposes. This simplifies the modular construction and simplifies an expansion or reduction in the accumulator volume that may be planned.

To increase the reliability of the underwater pumped storage power plant, the base body or the pump-turbine unit can include redundant pumps and valves and/or a cleaning system for automatic cleaning of the water inlets and water outlets.

The base body can also have separate hollow spaces, for example in the outer wall, wherein bulk material can be poured into the hollow spaces as weighting material.

According to a preferred embodiment of the present disclosure, the pressure vessel has an additional water storage area, not used for energy storage during normal operation, that can be pumped empty in order to reduce the mass of the storage reservoir such that it can be brought up from the ocean floor to the ocean surface. This additional water storage area can either be created by the means that the main cavity is not pumped entirely empty in normal operation, or else one or more separate hollow spaces may be present for this purpose, perhaps in the vessel wall. In this way, the mass of the pressure vessel and/or of the base body can be reduced sufficiently by pumping the additional water storage area empty that the pressure vessel floats on its own, or at least can be brought up with a cable. The pressure vessel that constitutes the water storage volume with the lower potential energy can accordingly be sunk to the ocean floor and brought back to the surface of the water. Thus, maintenance or repair work can be carried out regularly at the surface.

It is useful for the pressure vessel to have the shape of a cylinder or of a polyhedron. However, the pressure vessel can also be designed in the shape of a sphere or of a torus composed of a closed ring of pressure-resistant pipes, if applicable with arched end surfaces. A torus has the advantage that it cannot roll away on the ocean floor. It is likewise useful for the integrated accumulator complex to have the shape of a cylinder or of a polyhedron. For reasons of construction, for example to achieve a low center of gravity for the accumulator system or to reinforce anchoring points, a different shape such as an upright trapezoid may be useful for the integrated accumulator complex. It is especially preferred for the structural shape to be chosen such that a fiber-reinforced concrete and/or a centrifugal casting process can be used to produce the pressure vessels and/or the integrated accumulator complex.

The water inlet and water outlet can be designed to be separate or combined. In the latter case, the pump and generator preferably are designed as a common pump-turbine. In this case, a common valve may possibly suffice at the combined water inlet and water outlet, by which means the number of valves is reduced, wherein a plurality of pump-turbines can nonetheless be present.

With the underwater pumped storage power plant, therefore, a power supply network can be created that comprises the following:

A plurality of primary power plants that generate fluctuating energy over time, such as wind power stations and/or photovoltaic systems, one or more underwater pumped storage power plants according to the present disclosure, a plurality of points of consumption for electrical energy, and a network of electric lines connecting the points of consumption, the underwater pumped storage power plants, and the primary power plants with one another so that when there is an energy surplus from the power plants, the electrical energy generated by the primary power plants is reversibly stored by the underwater pumped storage power plants, and at times of high demand, electrical energy is recovered, and the recovered electrical energy can be supplied to the points of consumption.

Below, the present disclosure is explained in detail using exemplary embodiments and with reference to the figures, wherein identical and similar elements are in part labeled with identical reference numbers, and the features of the various exemplary embodiments can be combined with one another.

BRIEF DESCRIPTION OF THE FIGURES

Shown are.

DETAILED DESCRIPTION OF THE PRESENT DISCLOSURE

Figure 1:
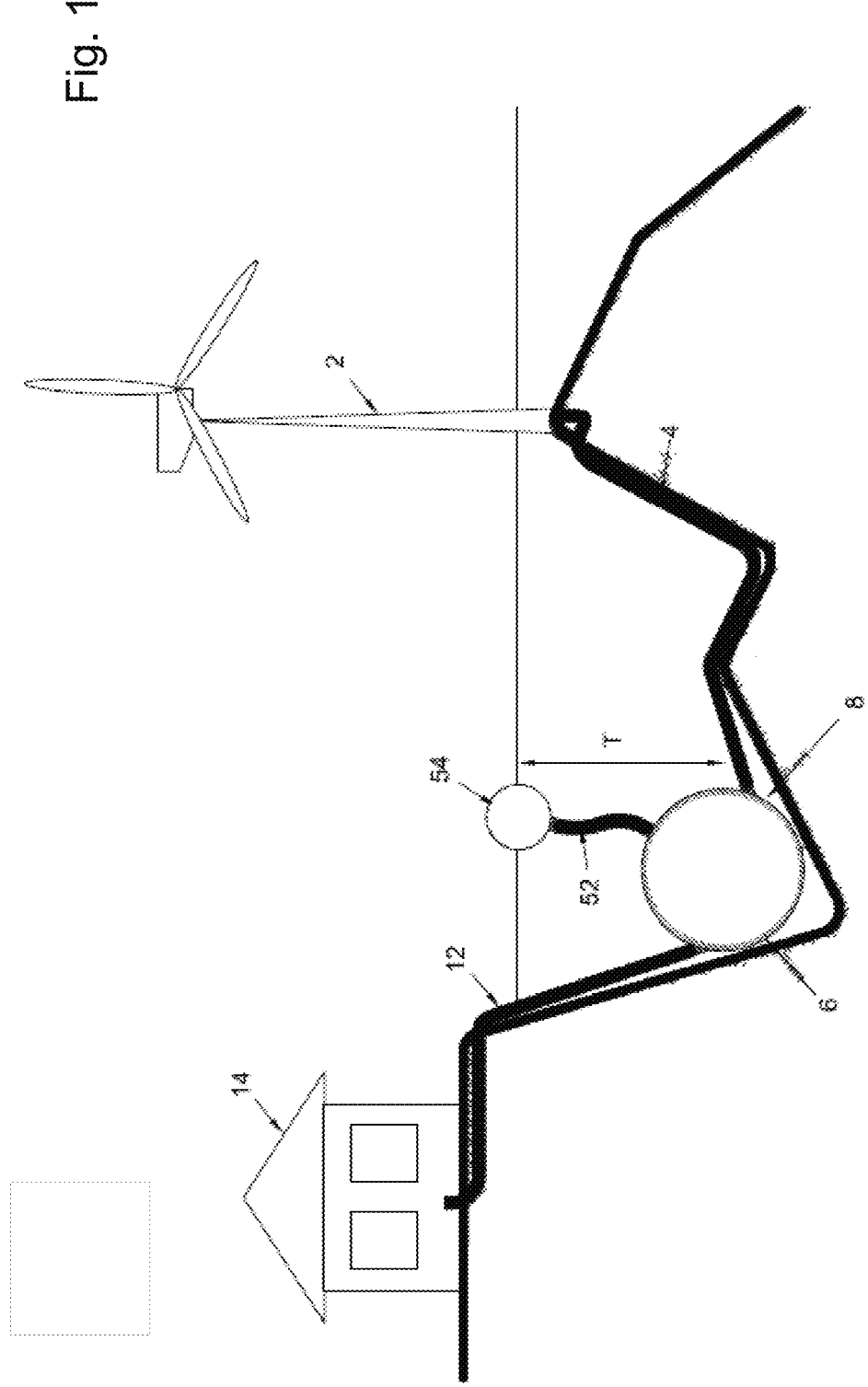
FIG. 1 a schematic representation of an underwater pumped storage power plant according to the present disclosure with wind power station and loads, FIG. 2 a schematic representation of an embodiment of the underwater pumped storage power plant with multiple pressure vessels, FIG. 3 a side view of the embodiment of the underwater pumped storage power plant from FIG. 2, FIG. 4 a schematic representation of an embodiment of the integral accumulator complex, FIG. 5 a schematic representation of another embodiment of the integral accumulator complex, FIG. 6 the side view of an integral accumulator complex with pressure vessel connection, FIG. 7 an embodiment of the pumped storage power plant with multiple integral accumulator complexes, FIG. 8 a schematic representation of another embodiment of the underwater pumped storage power plant with a base body and a pump-turbine unit, FIG. 9 a schematic representation of the underwater pumped storage power plant from FIG. 8 with connected pressure vessels, FIG. 10 a schematic representation of an embodiment of the integral accumulator complex, FIG. 11 a schematic representation of another embodiment of the integral accumulator complex, FIG. 12 a schematic representation of a shell of a base body, FIG. 13 the base body shown in FIG. 12 with filler and prepared hollow spaces, FIG. 14 the base body shown in FIG. 13 with additional pressure vessels, FIG. 15 a schematic representation of another embodiment of the underwater pumped storage power plant with two pump-turbine units, FIG. 16 a schematic representation of yet another embodiment of the underwater pumped storage power plant with round pressure vessels.

Referring to FIG. 1, first, the basic structure of the electrical networking of the pumped storage power plant 6 is shown schematically as an overview. Electrical energy is symbolically generated by means of a certain electrical power plant, in this example a wind turbine 2. The wind turbine 2 is connected to the pumped storage power plant 6 by a power line 4 in order to carry the electrical energy from the primary power plant to the pumped storage power plant 6. The pumped storage power plant 6 is located on the ocean floor 8 at a water depth T, which can be a few hundred to a few thousand meters depending on the existing geographic conditions. The pumped storage power plant 6 is also connected to a load 14 by a power line 12 in order to carry the electrical energy from the pumped storage power plant 6 to the load.

It is evident that the wind turbine 2 shown can representatively stand for a plurality of wind turbines, and that other renewable, fluctuating energy plants such as photovoltaic systems, etc. can also be used. In addition, the load 14 representatively stands for a plurality of loads that are connected to the existing part of the general power supply network into which the recovered electrical energy from the pumped storage power plant 6 is fed when the demand exceeds the power output provided by the primary power plants. The illustrated power lines 4 and 12 representatively stand for the connection to the general power supply network with its integration of power sources and power sinks.

In the example shown, the pumped storage power plant 6 is connected by a cable 52 to a floating buoy 54 so that the pumped storage power plant 6 can be easily detected even at the water surface and, if applicable, brought to the surface using the cable 52.

Figure 2:
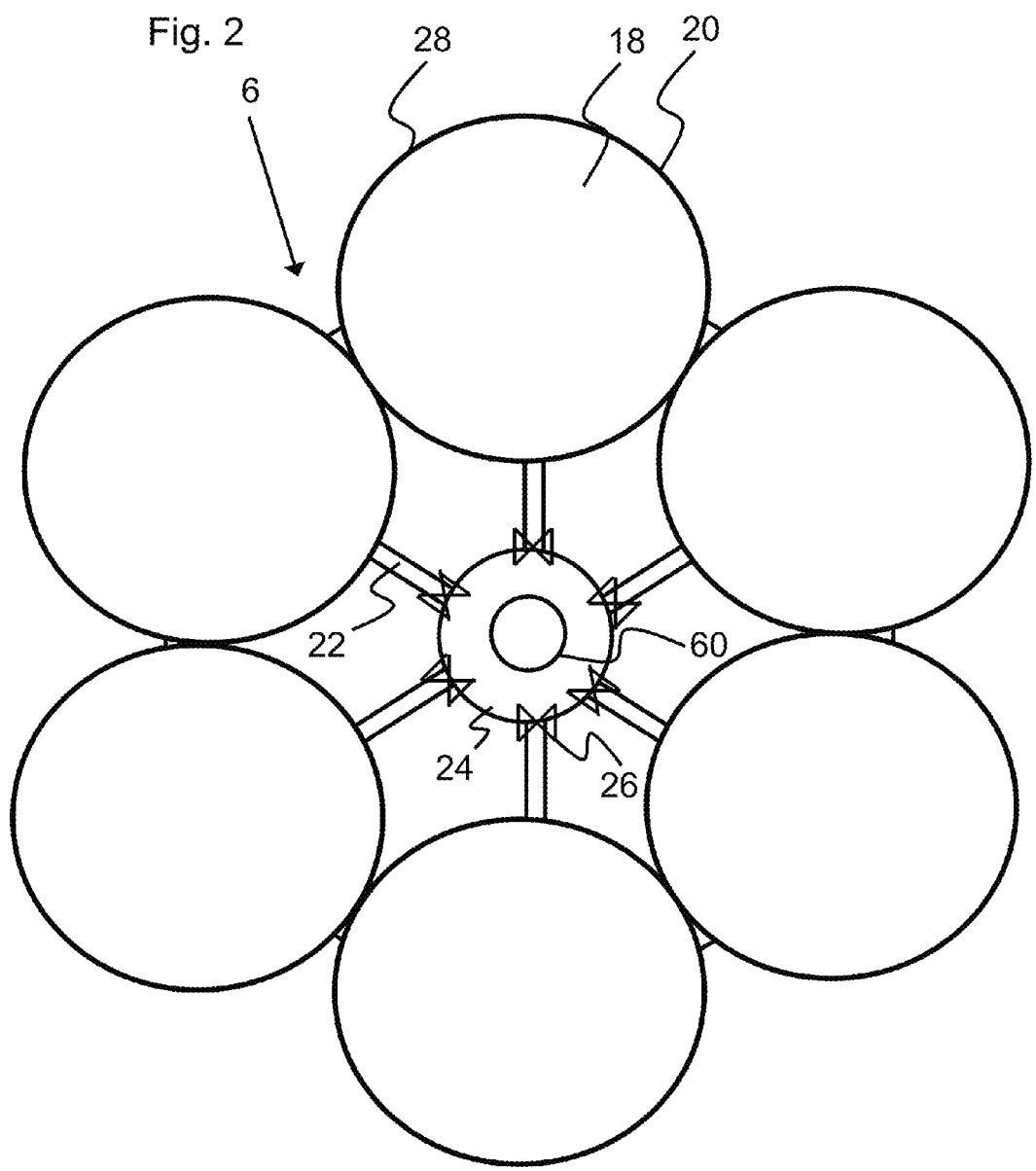

Referring to FIG. 2, in a top view, multiple pressure vessels 20 are connected to the centrally located sump 24 by pressure vessel connections 22, which in the embodiment shown constitute both inflow and outflow for the applicable pressure vessel 20, and together the vessels form the accumulator system 30. The pressure vessel connections 22 can each be closed with a shutoff valve 26 so that individual pressure vessels 20 can be disconnected and brought to the surface, for example for maintenance purposes. The sump 24 is located directly at the pump-turbine unit 60. During storage operation, water is pumped out of the internal cavities 18 of the pressure vessels 20 into the surrounding ocean 1 by means of a pump 16 (not shown) located in the pump-turbine unit 60. The pump 16 draws the water out of the pump sump 24, and pumps the water through a water outlet 35 (not shown) directly into the surrounding ocean 1. Accordingly, the internal cavities 18 of the artificial pressure vessels 20—in the example shown, six internal cavities 18 of six pressure vessels 20—together form one of the two water reservoirs of the pumped storage power plant (namely the one with the lower potential energy). As a result of the fact that the pump 16 must pump the water against the hydrostatic pressure PT prevailing at the water depth T, a large quantity of electrical energy is consumed and converted into potential energy, as is illustrated by the following examples. The pressure vessel 20 stores an energy quantity E in kilowatt-hours as a function of the volume V of the storable water in cubic maters and the water depth T in meters and at a density of water of 1000 kg/m³:

$$E(\text{kW}) = V(\text{m}^3) \times T(\text{m}) \times 9.81/3600$$

In an example with a volume V=10,000 m³, a water depth T=2000 m, and a pressure vessel 20 with a spherical shape and a cavity diameter of 28 m, electrical energy E of approximately E=58,000 kWh=58 MWh can be stored. This means that a power output of approximately 10 megawatts can be delivered over a time period of 6 hours. In the case of a daily cycle of recharging the pump storage by wind power or photovoltaic energy, which is to say daily filling and pumping out of the storage volume V, this results in a stored energy quantity of approximately 20,000 MWh per year.

However, it seems possible to build even larger pressure vessels 20. In the case of a spherical pressure vessel 20 with a diameter of 280 m, the result is an approximate volume V=10,000,000 m³. With, once again, an assumed submersion depth T=2,000 m, an approximate energy quantity E=58,000 MWh can be stored. This corresponds to a power output of approximately 5 gigawatts over a time period of about 12 hours. This means that with one such accumulator sphere 20, it would be possible to store the quantity of energy produced by approximately 1,000 wind turbines 2 with a power output of 6 megawatts each over a period of nearly 10 hours. In the case of a daily cycle of recharging the storage by wind power, which is to say daily filling and pumping out of the storage volume, this results in a stored energy quantity of approximately 20,000 GWh per year.

Figure 3:
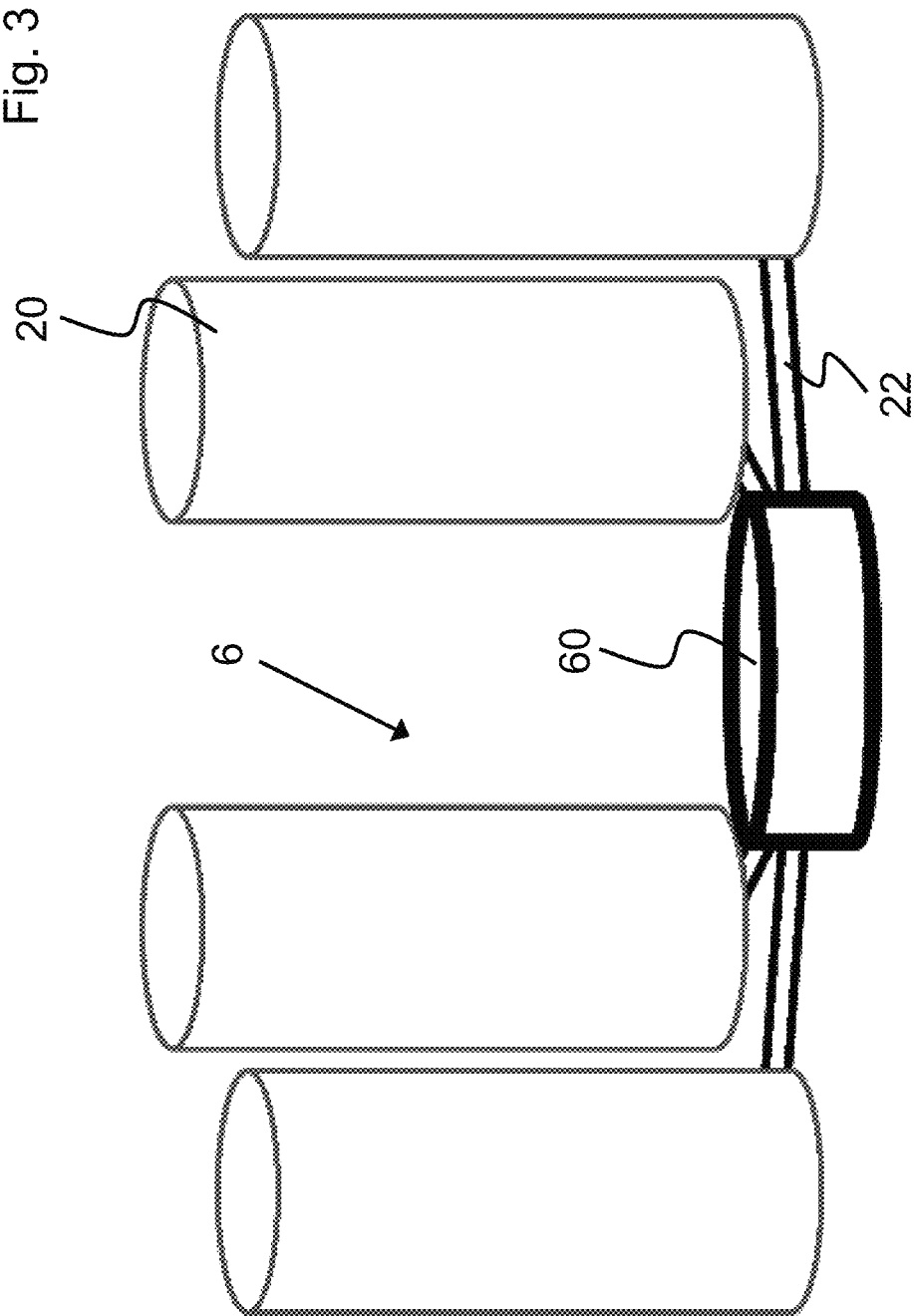

FIG. 3 shows the embodiment from FIG. 2 in a side view, with the cylindrical shape of the pressure vessels 20 and the central arrangement of the pump-turbine element 60 made even clearer. In the embodiment shown, the pressure vessels 20 are connected to the central pump-turbine element 60 by means of pressure vessel connections 22.

Figure 4:
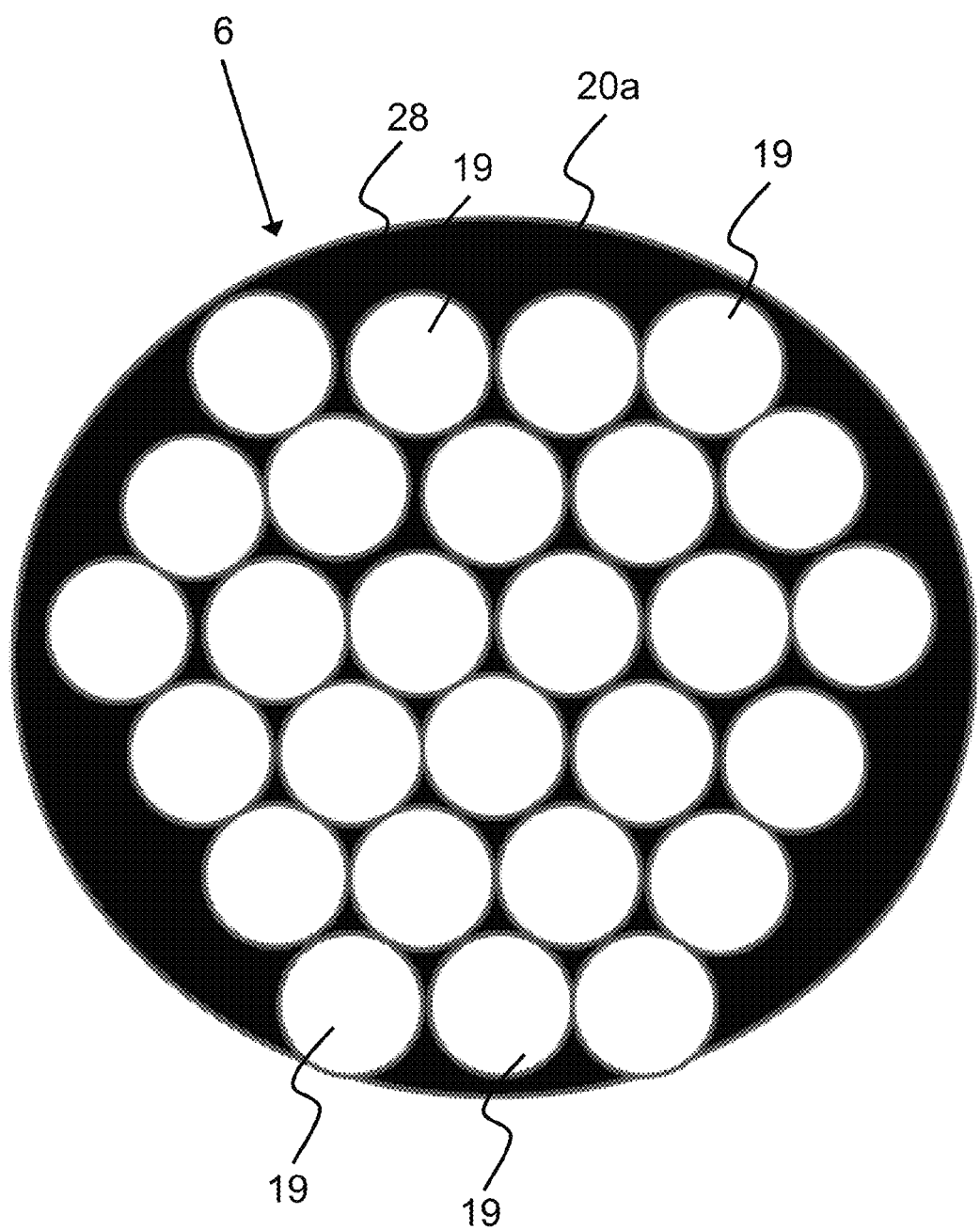

FIG. 4 shows an alternative embodiment of the accumulator system with an integrated accumulator complex 20a. A plurality of internal pressure vessel elements 19 form a common accumulator volume 20a, and are connected to one another at one end of the integrated accumulator complex 20a. In the case of a standing arrangement, this end is the bottom of the integrated accumulator complex, which thus already forms the sump 24 of the accumulator complex, where the water of the pressure vessel elements 19 can flow together. The pressure vessel elements 19 are composed of pipes, for example, steel pipes or fiber-reinforced concrete pipes, that are arranged upright next to one another. The outer wall 28 is then cast around the pipes such that the hollow spaces and the region directed outward toward the ocean water 1 are filled. The material thickness of the pipes is either chosen such that it is sufficient to withstand the pressure of the water column present outside so that the outer wall 28 secures the pipes against falling for the purposes of statics, and additionally weights the structure for sinking to the ocean floor 8, or the material thickness of the pressure vessel elements 19 can be chosen to be thinner so that the outer wall 28 of the integrated accumulator complex 20a simultaneously also withstands the pressure of the water column present outside.

Figure 5:
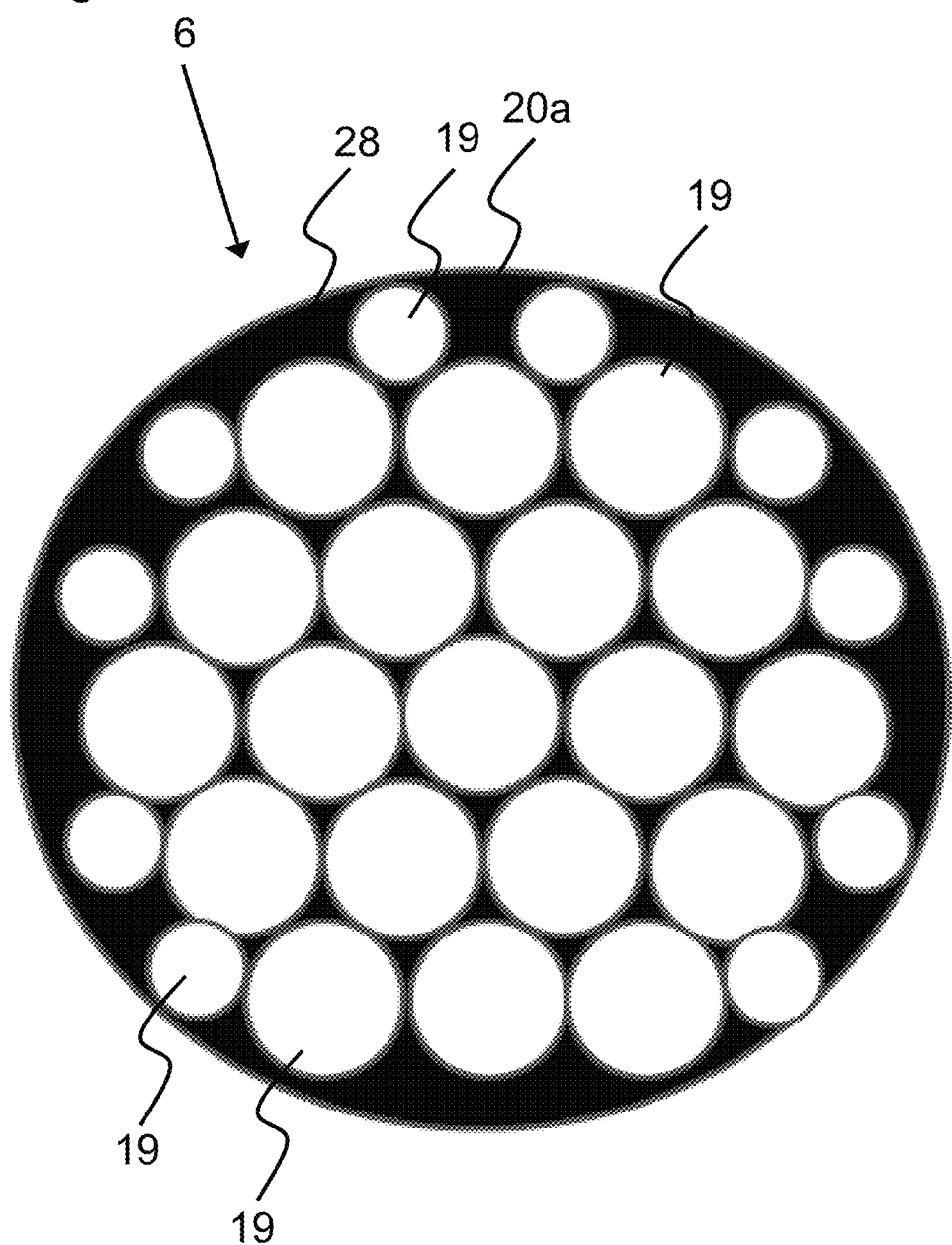

FIG. 5 shows an embodiment of the pressure vessel 20 similar to the one in FIG. 4 as an integrated accumulator complex 20a, wherein the volume enclosed by the outer wall 28 is optimally utilized by the selection of different, appropriate pipe diameters of the individual internal pressure vessel elements 19. Where applicable, the smaller hollow spaces shown in the outer region of the integrated accumulator complex 20a are also suitable for being weighted or filled with a ballast.

Figure 6:
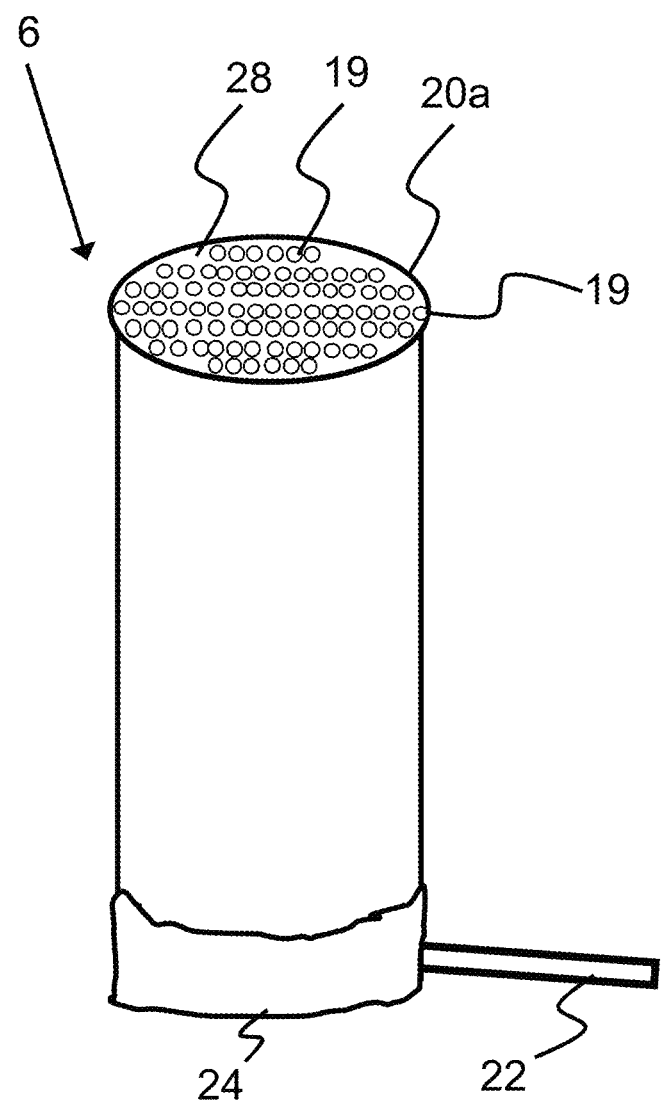

FIG. 6 shows a side view of an integrated accumulator complex 20a with a plurality of pressure vessel elements 19 and an outer wall 28 enclosing the pressure vessel elements 19. The integrated accumulator complex 20a has, at the bottom, a sump 24 of the accumulator complex, and is hydraulically connected to a central pump-turbine unit 60 (see FIG. 7) by a pressure vessel connection 22. The pressure vessel connection 22 is thus also the water inlet and water outlet of the integrated accumulator complex 20a, and can also be connected to additional pressure vessels 20 (not shown). In this embodiment, the integrated accumulator complex 20a has no moving mechanical parts or components of the power electronics for power generation or power dissipation.

Figure 7:
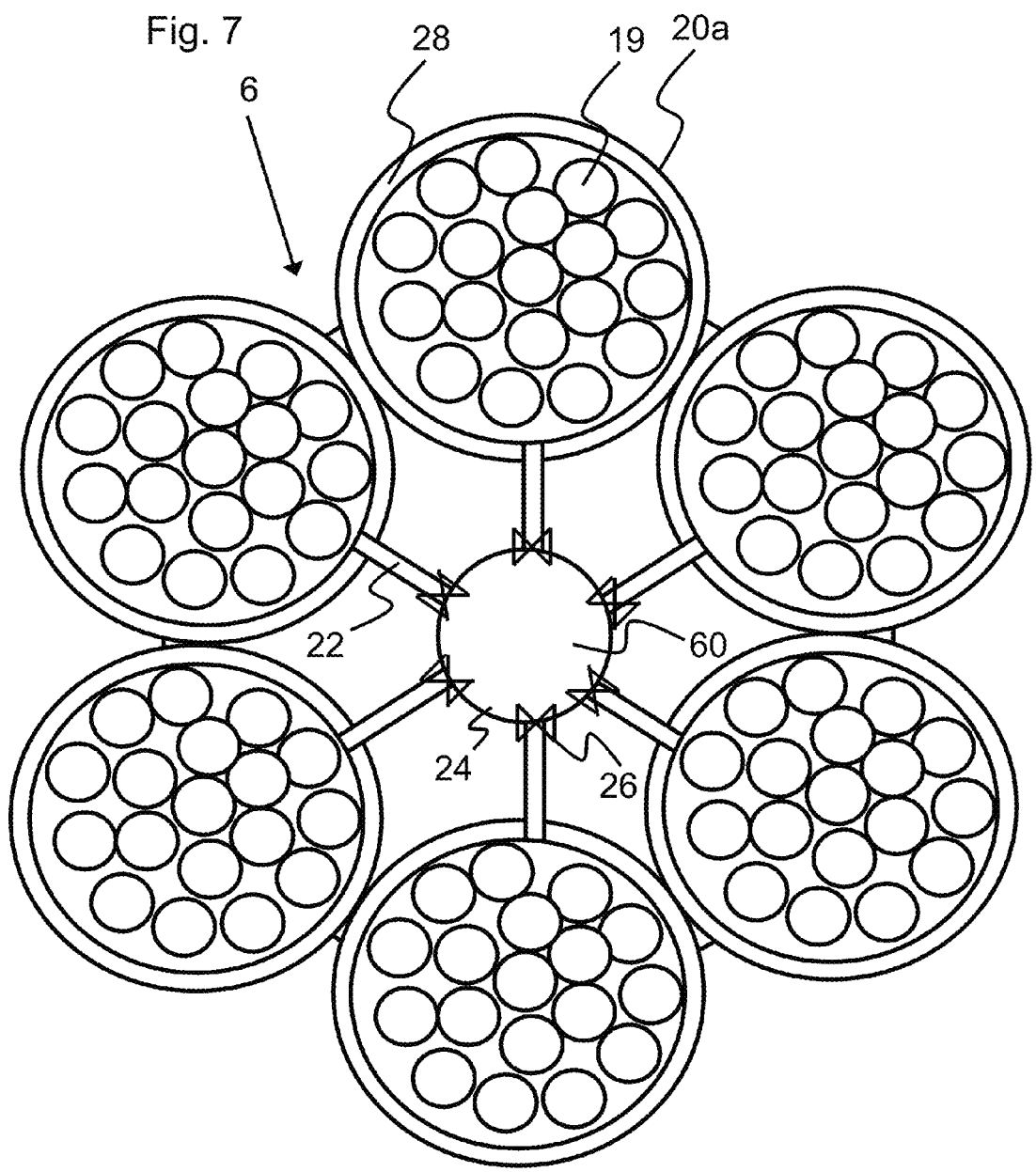

FIG. 7 shows a schematic top view of an underwater pumped storage power plant 6 with a central pump-turbine unit 60, and connected thereto by pressure vessel connections 22, integral accumulator complexes 20a, each having a plurality of pressure vessel elements 19. In this embodiment, the integral accumulator complexes 20a have no moving parts, since both the pump 16 and the turbine 36, as well as the shutoff valves 26, are integrated at or in the pump-turbine unit 60. In the event of a failure or when maintenance is needed, the shutoff valves 26 can disconnect the integral accumulator complexes 20a from the central pump-turbine unit 60. The pump-turbine unit 60 also constitutes the hydrostatically lowest point at the pump 16, the sump 24, the point to which the water flows of its own accord because of gravity.

Figure 8:
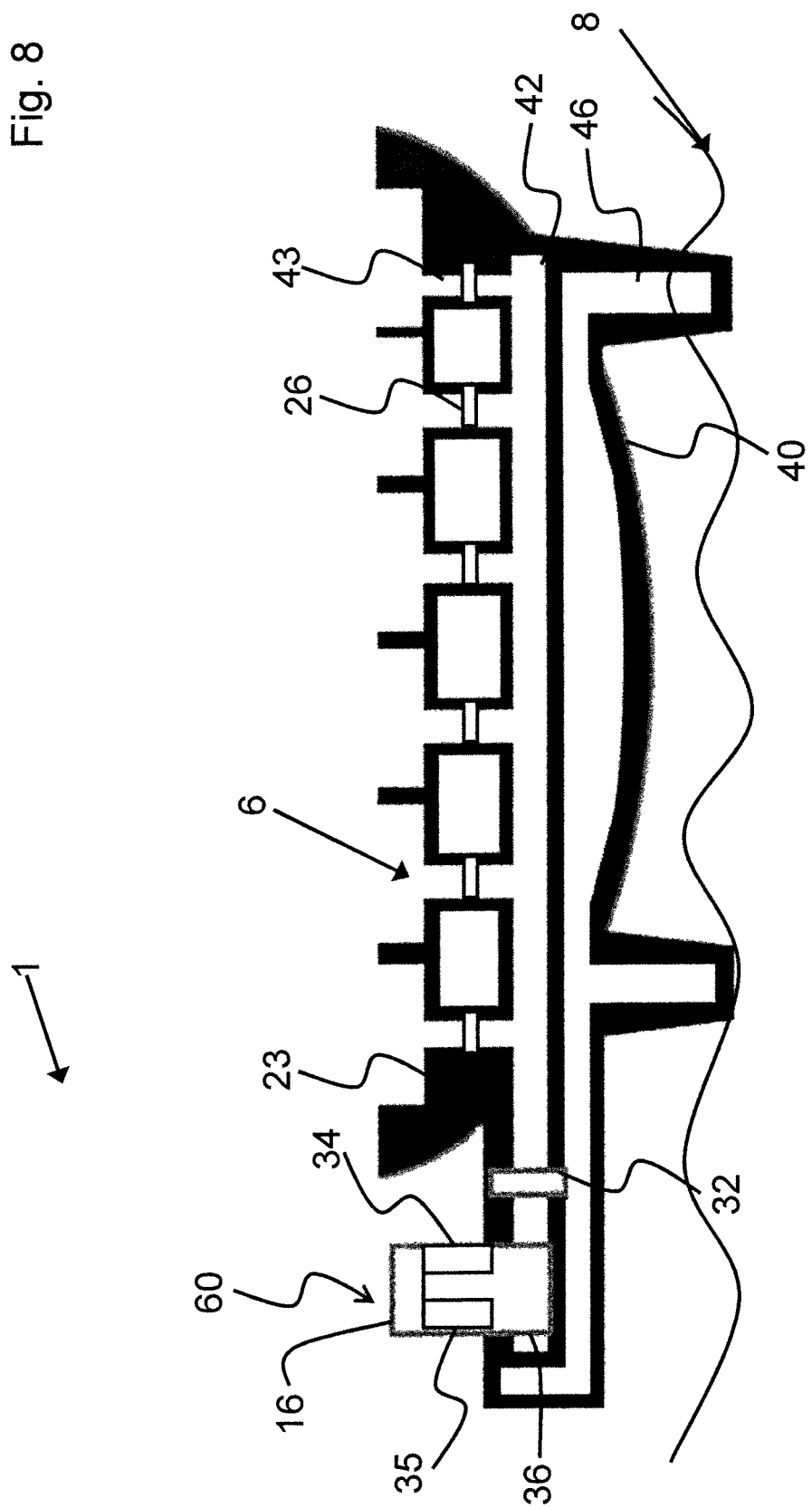

FIG. 8 shows another embodiment of the modular pumped storage power plant 6, wherein a base body 40 forms the base for accommodating additional components of the pumped storage power plant 6 and for their fastening or anchoring at the ocean floor 8. In its interior, the base body 40 has side passages 43 for connecting the accumulator 20 (see FIG. 9) to a main passage 42, which in turn is connected to the turbine 16 as well as the pump 36 in the embodiment shown. Thus, the main passage 42 forms both the intake from the turbine 16 to the accumulators 20 and the discharge from the accumulators 20 to the pump 16, so that only one passage, and thus possibly only one opening as well, is required in the outer wall of each individual pressure vessel. A shutoff valve 26 is built into each side passage 43 so that the pressure vessels 20 installed at each of the connection couplings 23 of the side passages 43 can be shut off and disconnected from the base body 40, for example for maintenance purposes. The shutoff valves 26 in the side passages 43 of the base body 40 also make it possible to use a universal base part in which individual connection couplings 23 remain unused in the event that only a smaller accumulator volume is required, so that the base bodies can be produced in large-scale production and can nevertheless be adapted to the applicable application area.

Figure 9:
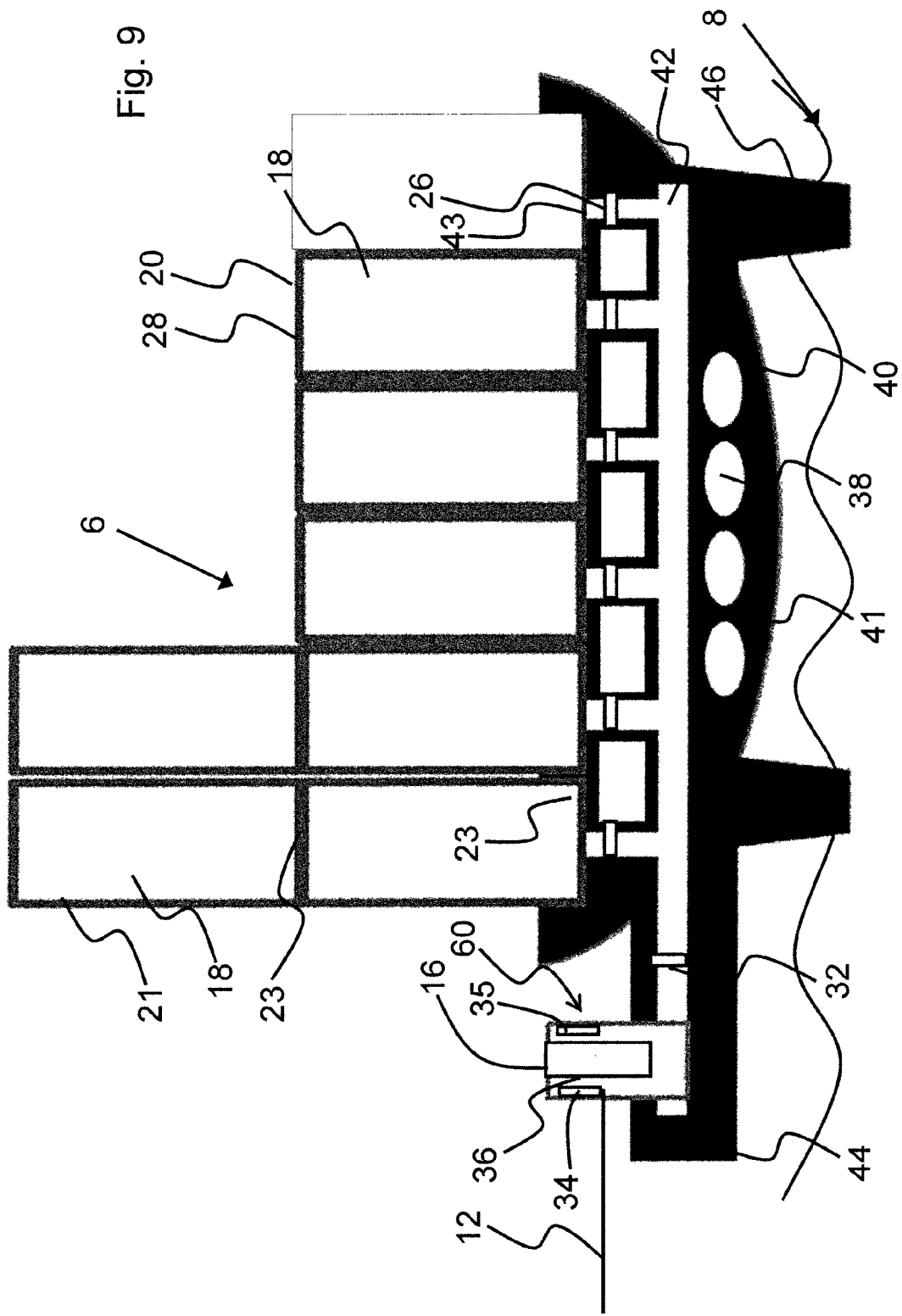

On its underside, the base body 40 has feet 46 that stand on the ocean floor 8 to secure the base body 40 or are sunk into the ocean floor 8 when the base body 40 rests on the ocean floor 8. FIG. 9 shows an embodiment of the pumped storage power plant 6 with base body 40, pump-turbine unit 60, and a plurality of pressure vessels 20 installed at connection couplings 23 of the base body 40 that form a common, modular accumulator volume and are supplied for filling and emptying by the common pump-turbine unit 60. Depending on requirements and, for example, the efficiency of components of the pump 16 and turbine 36 that are to be selected, multiple pump-turbine units 60 can also be installed on one base body 40 in order to increase efficiency and power output.

In order to recover the energy stored in the pressure vessels 20 of the pumped storage power plant 6 that have been pumped empty, an intake/discharge valve 32 and the shutoff valves 26 of the side passages 43 are opened, and water from the surrounding ocean with the hydrostatic pressure PT corresponding to the water depth T flows through a water inlet 34 and through the turbine 36 into the internal cavities 18 of the pressure vessels 20, and hence into the common pumped storage volume, whereupon the energy stored by the pumping-out process can be recovered, less the usual output losses. The recovered electrical energy is fed into the general power supply network through the power line 12. To increase the power output, multiple water inlets 34 with valves 32 and turbines 36 may be present. To avoid vibrations of the pressure vessels due to the great water flow, the internal cavities 18 can be spanned by struts or a supporting framework (not shown). The transverse struts can perform a dual function in this design, firstly to stabilize the pressure vessel 20, and secondly to create turbulence in the water flowing into the internal cavity 18 through the generator 36 in order to prevent resonant vibrations in the pressure vessel 20.

The pressure vessel 20 includes a tubular concrete wall 28 with a connection coupling 23 on the bottom, and if applicable another connection coupling 23 on the top, so that the pressure vessels 20 can be coupled to the base body 40 and additional pressure vessels 21 can be coupled to the pressure vessels 20. The wall thickness of the pressure vessels 20 and the base body 40 is chosen as a function of the water depth T to which the pumped storage power plant 6 is sunk and as a function of the mass required so that it can still be sunk. The turbines 36 and the pumps 16 are located directly on the base body 40, e.g., directly at the main passage 42, or on an extension 44 of the base body 40. In the embodiment shown, the pump 16, turbine 36, and water inlet and outlet openings 34, 26 are arranged such that they are integrated in a pump-turbine unit 60. To store and recover electrical energy, the water is conducted only over a short distance, namely only through the inlet and outlet openings 34, 26. Accordingly, the pumped storage power plant 6 requires only electrical lines 4, 12 from the ocean surface to the ocean floor 8, but not pipes or lines to transport water. If applicable, one electrical line can even suffice as the power supply and delivery line. It may be a further advantage that the pressure difference resulting from the great depth of water is not strongly dependent on the fill level within the pressure vessel 20, so that the power output that is available is essentially constant regardless of the fill level.

The base body 40 has hollow spaces 38 in its wall 28 that are filled with bulk material, e.g. sand, in order to tare the mass of the pumped storage power plant 6. Preferably, the pumped storage power plant 6, or its components including the base body 40 and pressure vessels 20, is first tared so as to still barely float when pumped completely empty so that it can be transported by ship to the site where it is to be sunk. Then, at the sinking site, the base body 40 and/or pressure vessel 20 is sufficiently weighted with ballast water that the pumped storage power plant 6 sinks. For example, the base body 40 can be sunk first, and the pressure vessels 20 are then installed on the base body 40 on the ocean floor 8, or else the pressure vessels 20 are attached to the connection couplings 23 of the base body 40 while still on the ocean surface, and the entire pumped storage power plant 6 is then sunk. The quantity of water used as ballast water is used only for weighting, and is not pumped out during normal operation, i.e. during storage and recovery of electrical energy, so that in normal operation the pumped storage power plant 6 always has a mass greater than the displaced water and hence remains on the ocean floor 8. The ballast water can also be poured into the separate cavities 38, however. For purposes such as maintenance activities, for example, the additional ballast water not provided for energy storage in normal operation can be pumped out, however, so that the pumped storage power plant 6 floats again or at least becomes light enough that it can be brought up, for example with the cable 52, which is marked at the ocean surface with a floating buoy 54 (see FIG. 1).

On account of the immense weight of the base body 40 and pressure vessels 20, it is preferred that they be built floating in water, e.g., cast successively in sections from steel-reinforced concrete while floating. In so doing, the unfinished pressure vessel should project far enough from the water during manufacture that it is not possible for its interior cavity 18 to fill up even during a storm. The thickness of the wall 28 of the pressure vessel 20 must withstand the extremely high hydrostatic water pressure, and must also give the pressure vessel 20 a dead weight high enough that the pumped storage power plant 6 sinks to the ocean floor 8 with an at least nearly empty interior cavity 18. Steel-reinforced concrete, for example, comes into consideration as a wall material. The structural analysis is carried out such that the pressure vessel 20 can withstand pressures higher than those present at the ocean floor 8 without damage. All components relevant to the system, such as valves 26, 32, turbines 36, pumps 16, passages 42, 43, and/or electrical lines etc., are integrated into the base body 40, and the pressure vessels 20 are equipped with connection couplings 23 so that they can later perform their function for many decades. The monitoring and control electronics are likewise arranged directly on the base body 40 and are sunk with it.

Figure 10:
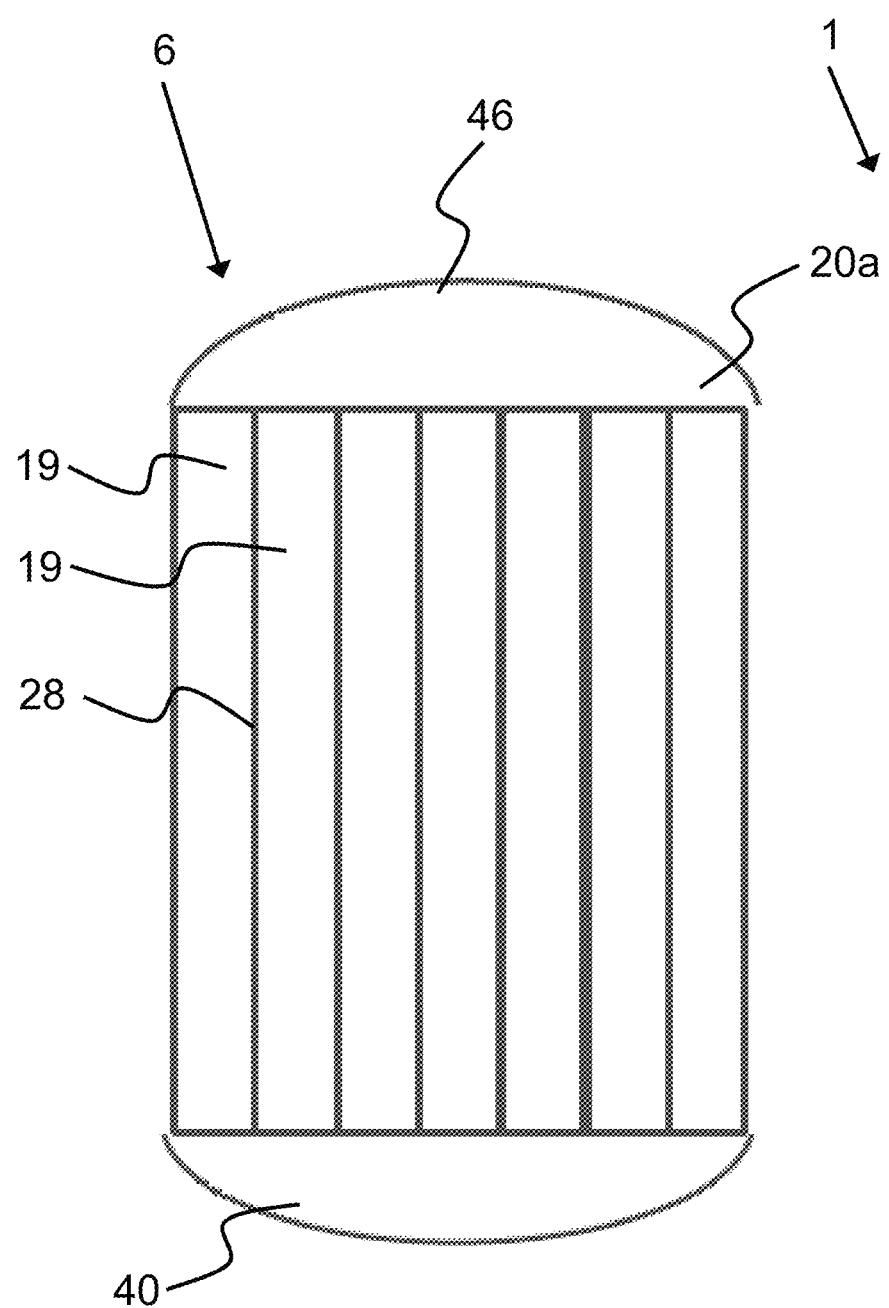

FIG. 10 shows a side view of an integrated accumulator complex with multiple interior pressure vessel elements 19, such as was presented in FIGS. 4 and 5. The pressure vessel elements 19 are hydraulically connected to one another through a base body 40 and constitute a common accumulator volume. A cover 46 is placed on the top to close and seal the accumulator complex with respect to the surrounding seawater 1. A pump-turbine unit 60 is arranged in the cover or in the base body 40 so that a separate pump and/or turbine does not need to be used for each of the pressure vessel elements 19; instead, the pressure vessel elements 19 share the common infrastructure of pump(s) 16, turbine(s) 36, and the electric power supply. The integrated accumulator complex with a plurality of pressure vessel elements 19 is thus an independent underwater pumped storage power plant 6.

Figure 11:
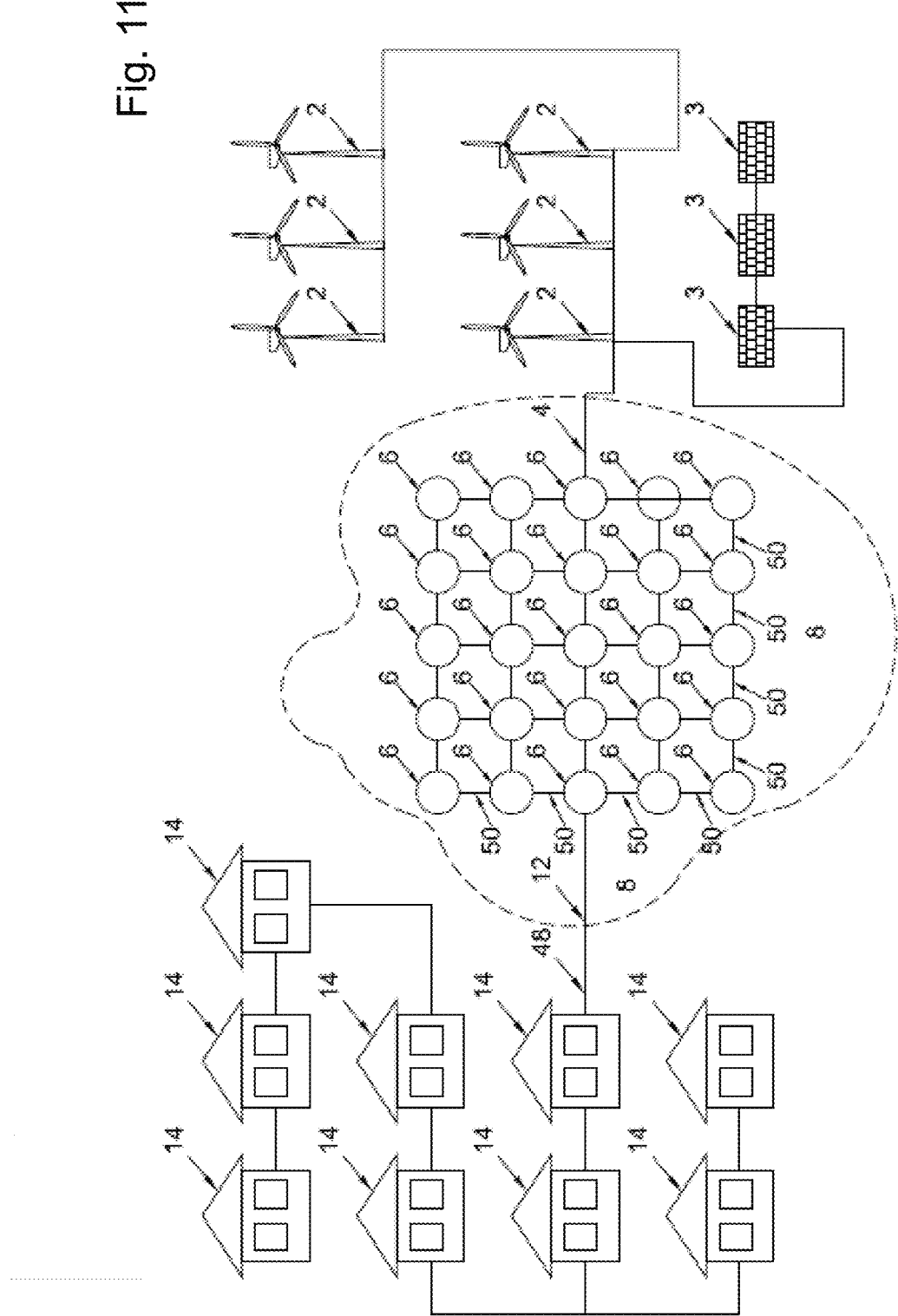

Referring to FIG. 11, a power supply network 48 is shown that has a plurality of networked loads 14 and a plurality of networked wind power stations 2 and photovoltaic systems 3 that form the primary power plants. The electric power generated by the primary power plants 2, 3 is temporarily stored by means of a plurality of pumped storage power plants 6 from FIGS. 2 through 4. The many pumped storage power plants 6 are networked on the ocean floor 8 solely by means of electric underwater lines 50, and supply the recovered electrical energy as needed through the existing part of the power supply network 48 to the loads 14.

Figure 12:
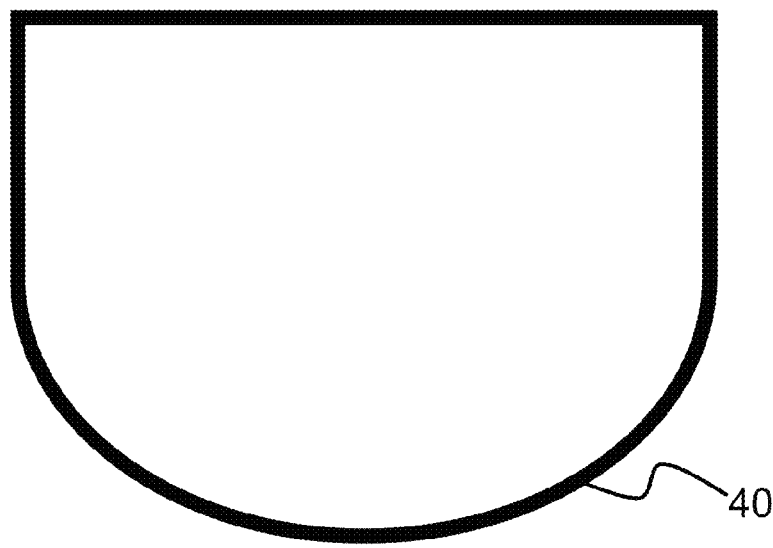
Figure 13:
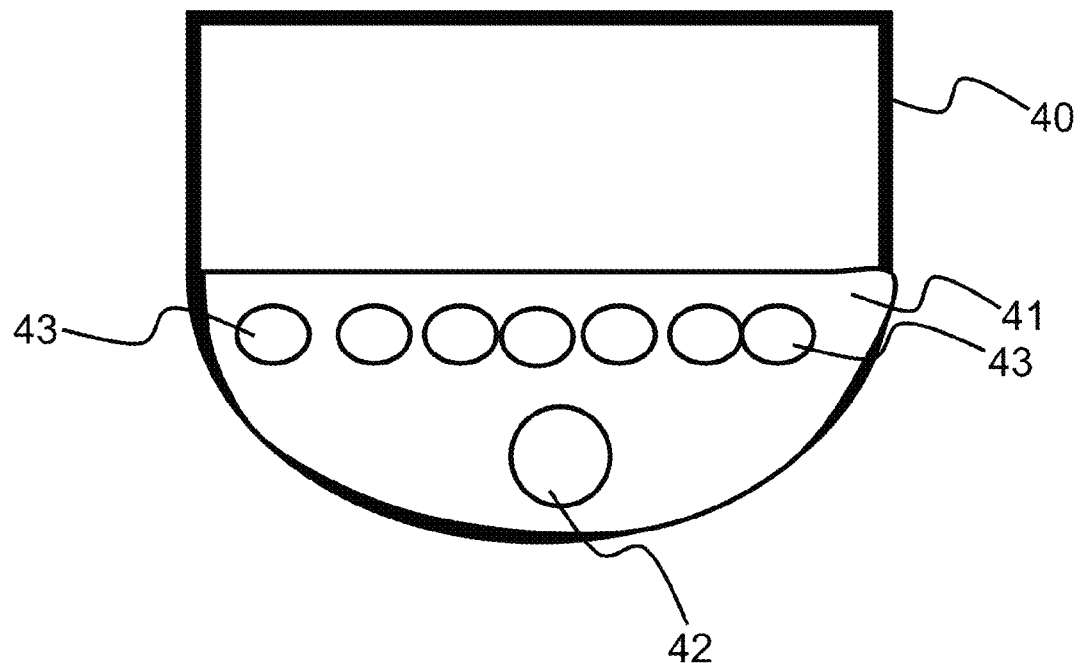
Figure 14:
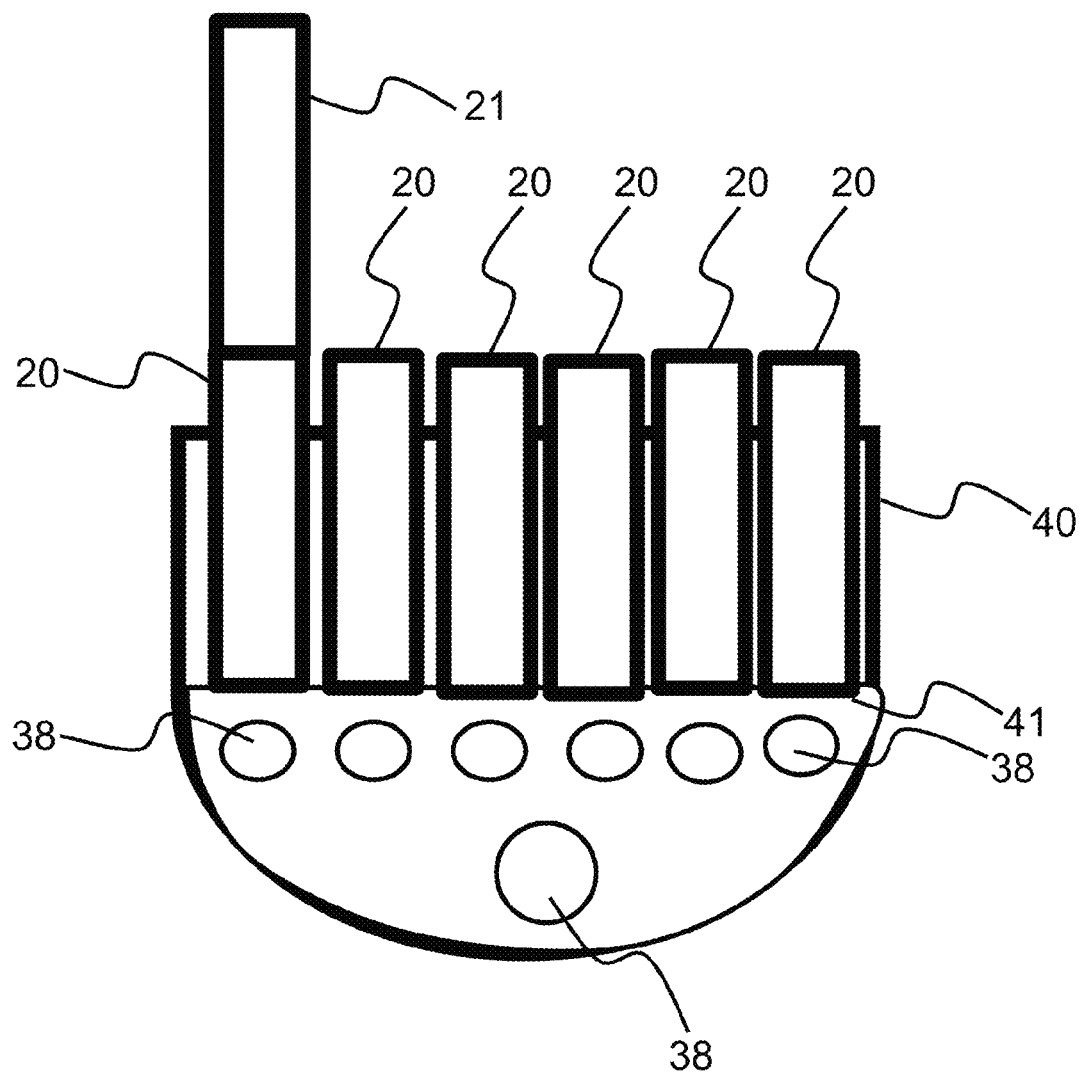

FIGS. 12 to 14 show a preferred manufacturing process in which, referring to FIG. 12, an unfinished shell of the base body 40 is first produced at a dock or harbor. It is manufactured such that it always barely floats, and is then towed to some place in the ocean where it is sunk to the ocean floor with some ballast. The dock at the harbor can be used as formwork for the base body 40 under certain circumstances.

Referring to FIG. 13, connecting pipes to the turbine and to the pump that take on the function of the previously described main passage 42 and side passages 43 integrated into the base body 40 have already been laid in the base body 40. Moreover, a base weight or filler 41 has been poured into the base body 40, which is to say that concrete, for example, has been poured in. The filler can enclose the main and side passages 42, 43 in a simple manner.

Referring to FIG. 14, the base body 40 can still be in the harbor or dock used for manufacture, or can already be on the high seas. Shown are pressure vessels 20 and an additional pressure vessel 21, which are placed on the filler 41. In the simplest case, the pressure vessels 20, 21 are placed on the base body 40 in the harbor by container crane and anchored.

FIG. 15 shows another embodiment of the underwater pumped storage power plant. To begin with, it differs from the embodiment shown in FIG. 9 in that a second pump-turbine block 62 is arranged on the base body 40; this can increase the electricity production in parallel operation and/or increase reliability, for example. The base body in this embodiment includes two intake/discharge valves, located before the applicable pump-turbine block 60, 62, for separate operation of the pump-turbine block 60 and the second pump-turbine block 62. Furthermore, the pressure vessels 20 are implemented as simple pipes that are connected to one another and have a common cover 46 at the top, which can likewise be simply cast from concrete, for example.

In the embodiment shown in FIG. 16, the pressure vessels 20 are implemented as spherical pressure vessels 20 and have simple pressure vessel connections 22. The pressure vessels are simply screwed to one another, for example.

It is evident to an individual skilled in the art that the embodiments described above should be considered as examples, and that the invention is not limited thereto, but instead can be varied in multiple ways without departing from the invention. Furthermore, it is evident that, regardless of whether the features are disclosed in the description, claims, figures, or elsewhere, they also may define parts of the present disclosure singly, even if they have been described in combination with other features.

LIST OF REFERENCE NUMBERS

1 Surrounding ocean
2 Wind turbine
3 Photovoltaic system
4 Power line
6 Pumped storage power plant
8 Ocean floor
12 Power line
14 Load
16 Pump
18 Internal cavity
19 Internal pressure vessel element
20 Pressure vessel
20a Integrated accumulator complex 21 Additional pressure vessel
22 Pressure vessel connection
23 Connection coupling
24 Sump
26 Shutoff valve
28 Outer wall
30 Accumulator system
32 Intake/discharge valve
34 Water inlet
35 Water outlet
36 Turbine
38 Hollow space
40 Base body
41 Filler
42 Main passage
43 Side passage
44 Extension
46 Cover
48 Power supply network
50 Underwater electric lines
52 Cable
54 Floating buoy
60 Pump-turbine unit
62 Second pump-turbine unit

The invention claimed is:

1. Underwater pumped storage power plant for temporary reversible storage of electrical energy from other power plants, comprising:
   an accumulator system having at least two pressure vessels,
   a water outlet to allow water to flow out of the accumulator system directly into the surrounding ocean against the hydrostatic water pressure corresponding to the water depth,
   a pump located at the water outlet to pump water out of the accumulator system into the surrounding ocean, wherein the pump converts electrical energy into the potential energy corresponding to the displaced water column when pumping the water out against the hydrostatic water pressure of the surrounding ocean,
   a water inlet to allow water to flow into the accumulator system directly from the surrounding ocean with the hydrostatic water pressure corresponding to the water depth,
   a common generator located at the water inlet, wherein the common generator converts the potential energy of the previously displaced water column back into electrical energy when the water flows in with the hydrostatic water pressure corresponding to the water depth,
   a base body for accommodating the at least two pressure vessels, the pump, and the common generator,
   electric lines to transport the electrical energy from the ocean surface to the underwater pumped storage power plant and back,
   wherein the pressure vessels are pressure resistant such that the pressure vessels can be pumped empty by the pump and be resistant to deformation from the hydrostatic water pressure at the ocean floor,
   wherein the pressure vessels are connected to one another by a sump constituting the lowest or at least one of the lowest points of the accumulator system, and wherein the water outlet is located at the sump, and
   wherein the pressure vessels and/or the base body in an emptied state are lighter than water and thus can float on the ocean surface so that the pressure vessels and/or the base body can be brought to the installation site while floating and can be sunk at the installation site;
   wherein the pressure vessels can be filled with water and constitute a common accumulator volume, wherein the common accumulator volume comprises the pressure vessels lined up in a row and connected to one another;
   wherein the pressure vessels are pipe sections, and wherein the wall thickness of the pipe sections is such that the pipe sections withstand the water pressure at the ocean floor;
   wherein the pressure vessels are internal pressure vessel elements, and wherein an integrated accumulator complex is made of closely packed pressure vessel elements in the form of pipes, and the hollow spaces between the pipes are filled with a filler in order to stabilize the integrated accumulator complex and to weight the accumulator system.

2. Underwater pumped storage power plant according to claim 1, wherein the base body connects the accommodated pressure vessels to the pump through an integral main passage in the interior of the base body so that the pressure vessels are connected to one another through the base body, and the pressure vessels form a common pressure vessel volume connected through the base body.

3. Underwater pumped storage power plant according to claim 2, wherein the base body has feet for stable and secure support of the base body on the ocean floor.

4. Underwater pumped storage power plant according to claim 2, wherein at least one of the pressure vessels or the base body have hollow spaces for filling with weighting material.

5. Underwater pumped storage power plant according to claim 2, wherein at least one of the pressure vessels or the base body have an internal supporting framework for additional reinforcement.

6. Method for manufacturing an underwater pumped storage power plant for reversible storage of electrical energy from other power plants, wherein the power plant includes a base body, an accumulator system having at least two pressure vessels, a water outlet to allow water to flow out of the accumulator system directly into the surrounding ocean against the hydrostatic water pressure corresponding to the water depth, a pump accommodated by the base body and located at the water outlet to pump water out of the accumulator system into the surrounding ocean, wherein the pump converts electrical energy into potential energy corresponding to a displaced water column when pumping the water out against the hydrostatic water pressure of the surrounding ocean, a water inlet to allow water to flow into the accumulator system directly from the surrounding ocean with the hydrostatic water pressure corresponding to the water depth, and a common generator accommodated by the base body and located at the water inlet, wherein the common generator converts the potential energy of the displaced water column back into electrical energy when the water flows in with the hydrostatic water pressure corresponding to the water depth, and wherein the method comprises the steps of:
   manufacturing the base body in a dock or a harbor,
   placing, in the dock or harbor, the pressure vessels onto the base body,
   connecting the pressure vessels with each other and with the common generator in a communicating manner through the base body,
   transporting the underwater pumped storage power plant in a floating manner to a place, where the underwater pumped storage power plant is to be sunk, and
   increasing the mass of the underwater pumped storage power plant sufficiently by pouring at least one of base weight, bulk material or ballast water into at least one of the base body or the pressure vessels, such that the mass of the underwater pumped storage power plant becomes greater than the mass of the displaced water and that the underwater pumped storage power plant sinks.

7. Method according to claim 6, further comprising the step of bringing back at least one of the pressure vessels or the base body to the surface of the water for maintenance purposes.

8. Underwater pumped storage power plant manufactured by the method of claim 6.

9. Power supply network comprising:
- a plurality of primary power plants that produce fluctuating electrical energy over time,
- at least one underwater pumped storage power plant manufactured by the method of claim 6, and
- a network of electric lines connectable between consumers of electrical energy, the at least one underwater pumped storage power plant, and the primary power plants so that when there is an energy surplus from the primary power plants, the electrical energy generated by the primary power plants is temporarily reversibly stored by the at least one underwater pumped storage power plant, and at times of high demand, the electrical energy is recovered, and the recovered electrical energy can be supplied to the consumers.

* * * * *

UNITED STATES PATENT AND TRADEMARK OFFICE
CERTIFICATE OF CORRECTION

PATENT NO. : 9,797,366 B2
APPLICATION NO. : 14/357328
DATED : October 24, 2017
INVENTOR(S) : Horst Schmidt-Boecking and Gerhard Luther It is certified that error appears in the above-identified patent and that said Letters Patent is hereby corrected as shown below:

On the Title Page

Item (73), Assignee: after Roentdek-Handels before the "," insert --GmbH--

Signed and Sealed this
Twenty-fourth Day of April, 2018

Andrei Iancu
*Director of the United States Patent and Trademark Office*